United States Patent
Cong et al.

(10) Patent No.: US 12,505,331 B2
(45) Date of Patent: Dec. 23, 2025

(54) QUANTUM CONVOLUTIONAL NEURAL NETWORKS

(71) Applicant: President and Fellows of Harvard College, Cambridge, MA (US)

(72) Inventors: Iris Cong, Cambridge, MA (US); Soonwon Choi, El Cerrito, CA (US); Mikhail D. Lukin, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1206 days.

(21) Appl. No.: 17/282,449

(22) PCT Filed: Oct. 4, 2019

(86) PCT No.: PCT/US2019/054831
§ 371 (c)(1),
(2) Date: Apr. 2, 2021

(87) PCT Pub. No.: WO2020/072981
PCT Pub. Date: Apr. 9, 2020

(65) Prior Publication Data
US 2021/0383189 A1     Dec. 9, 2021

Related U.S. Application Data

(60) Provisional application No. 62/742,100, filed on Oct. 5, 2018.

(51) Int. Cl.
*G06N 3/04* (2023.01)
*G06F 11/07* (2006.01)
(Continued)

(52) U.S. Cl.
CPC ........... *G06N 3/04* (2013.01); *G06F 11/0706* (2013.01); *G06N 3/063* (2013.01); *G06N 10/60* (2022.01)

(58) Field of Classification Search
CPC .......... G06N 3/04; G06N 10/60; G06N 3/063; G06F 11/0706
See application file for complete search history.

(56) References Cited

U.S. PATENT DOCUMENTS 3,872,470 A    3/1975   Hoerz et al.
4,479,199 A   10/1984   Friedlander et al.
(Continued)

FOREIGN PATENT DOCUMENTS

CN    106980178 A    7/2017
EP    1171968 B1    11/2002
(Continued)

OTHER PUBLICATIONS

Wikipedia. Convolutional neural network. Version from Jul. 24, 2018. https://en.wikipedia.org/w/index.php?title=Convolutional_neural_network&oldid=851809760. (Year: 2018).*
(Continued)

*Primary Examiner* — Markus A. Vasquez
(74) *Attorney, Agent, or Firm* — Wolf, Greenfield & Sacks, P.C.

(57) ABSTRACT

Systems and methods for quantum convolutional neural networks are described. Systems and methods can apply convolving and pooling layers to input qudits. The qudits can be measured to identify information about the input qudits. Systems and methods can also apply quantum convolutional neural network encoding and decoding techniques for quantum error correction.

34 Claims, 18 Drawing Sheets

(51) Int. Cl.
  *G06N 3/063* (2023.01)
  *G06N 10/60* (2022.01)

(56) References Cited

U.S. PATENT DOCUMENTS

| | | | |
|---|---|---|---|
| 5,684,621 | A | 11/1997 | Downing |
| 6,988,058 | B1 | 1/2006 | Sherwin et al. |
| 11,380,455 | B2 | 7/2022 | Keesling Contreras et al. |
| 11,710,579 | B2 | 7/2023 | Keesling Contreras et al. |
| 11,985,451 | B2 | 5/2024 | Kim et al. |
| 12,051,520 | B2 | 7/2024 | Keesling Contreras et al. |
| 2002/0089718 | A1 | 7/2002 | Penninckx et al. |
| 2004/0000666 | A1 | 1/2004 | Lidar et al. |
| 2004/0017833 | A1 | 1/2004 | Cundiff et al. |
| 2004/0126114 | A1 | 7/2004 | Liu et al. |
| 2006/0225165 | A1 | 10/2006 | Maassen van den Brink et al. |
| 2007/0113012 | A1 | 5/2007 | Cable et al. |
| 2008/0116449 | A1 | 5/2008 | Macready et al. |
| 2008/0185576 | A1 | 8/2008 | Hollenberg et al. |
| 2008/0237579 | A1 | 10/2008 | Barker et al. |
| 2008/0313430 | A1 | 12/2008 | Bunyk |
| 2009/0204877 | A1 | 8/2009 | Betts |
| 2009/0299947 | A1 | 12/2009 | Amin et al. |
| 2011/0238607 | A1 | 9/2011 | Coury et al. |
| 2014/0025926 | A1 | 1/2014 | Yao et al. |
| 2014/0200689 | A1 | 7/2014 | Utsunomiya et al. |
| 2014/0253987 | A1 | 9/2014 | Christmas |
| 2015/0317558 | A1 | 11/2015 | Adachi et al. |
| 2016/0064108 | A1 | 3/2016 | Saffman et al. |
| 2016/0125311 | A1 | 5/2016 | Fuechsle et al. |
| 2016/0328253 | A1 | 11/2016 | Majumdar |
| 2017/0300817 | A1 | 10/2017 | King et al. |
| 2018/0217629 | A1 | 8/2018 | MacFaden |
| 2018/0218279 | A1 | 8/2018 | Lechner et al. |
| 2018/0260731 | A1 | 9/2018 | Zeng et al. |
| 2019/0266508 | A1 | 8/2019 | Bunyk et al. |
| 2020/0185120 | A1 | 6/2020 | Keesling Contreras et al. |
| 2021/0279631 | A1 | 9/2021 | Pichler et al. |
| 2021/0365827 | A1 | 11/2021 | Monroe et al. |
| 2021/0383189 | A1 | 12/2021 | Cong et al. |
| 2022/0060668 | A1 | 2/2022 | Kim et al. |
| 2022/0138608 | A1 | 5/2022 | Ramette et al. |
| 2022/0197102 | A1 | 6/2022 | Christen et al. |
| 2022/0293293 | A1 | 9/2022 | Contreras et al. |
| 2022/0391743 | A1 | 12/2022 | Wild et al. |
| 2023/0326623 | A1 | 10/2023 | Keesling Contreras et al. |
| 2023/0400492 | A1 | 12/2023 | Xu et al. |
| 2024/0029911 | A1 | 1/2024 | Lukin et al. |
| 2024/0185113 | A1 | 6/2024 | Cong et al. |
| 2024/0289665 | A1 | 8/2024 | Pichler et al. |
| 2024/0346352 | A1 | 10/2024 | Bluvstein et al. |
| 2024/0347995 | A1 | 10/2024 | Levine et al. |

FOREIGN PATENT DOCUMENTS

| | | | |
|---|---|---|---|
| EP | 3113084 | A1 | 1/2017 |
| EP | 3438726 | A1 | 2/2019 |
| GB | 0205011 | A | 10/1923 |
| JP | 2004-045453 | A | 2/2004 |
| JP | 2007/233041 | A | 9/2007 |
| JP | 2008/134450 | A | 6/2008 |
| JP | 2008/158325 | A | 7/2008 |
| JP | 2014-197733 | A | 10/2014 |
| JP | 2017/078832 | A | 4/2017 |
| WO | WO-2014/051886 | A1 | 4/2014 |
| WO | WO-2019/014589 | A1 | 1/2019 |
| WO | WO-2020/072981 | A1 | 4/2020 |
| WO | WO-2020/172588 | A1 | 8/2020 |
| WO | WO-2020/236574 | A1 | 11/2020 |
| WO | WO-2021/007560 | A1 | 1/2021 |
| WO | WO-2021/141918 | A1 | 7/2021 |
| WO | WO-2022/132388 | A2 | 6/2022 |
| WO | WO-2022/132389 | A2 | 6/2022 |
| WO | WO-2022/174072 | A1 | 8/2022 |
| WO | WO-2022/132388 | A3 | 9/2022 |
| WO | WO-2022/132389 | A3 | 9/2022 |
| WO | WO-2023/287503 | A2 | 1/2023 |
| WO | WO-2023/287503 | A3 | 1/2023 |
| WO | WO-2023/287503 | A9 | 1/2023 |
| WO | WO-2023/080936 | A2 | 5/2023 |
| WO | WO-2023/080936 | A3 | 7/2023 |
| WO | WO-2023/132865 | | 7/2023 |
| WO | WO-2024/155291 | A2 | 7/2024 |

OTHER PUBLICATIONS

Auger et al., "Blueprint for fault-tolerant quantum computation with Rydberg atoms." Physical Review A 96(5): 052320 (2017).
Beugnon et al., "Two-dimensional transport and transfer of a single atomic qubit in optical tweezers" Nature Physics, vol. 3, p. 1-4 (2007).
Chao et al., "Fault-tolerant quantum computation with few qubits." npj Quantum Information 4.1 (2018): 42.
Cong et al., "Hardware-efficient, fault-tolerant quantum computation with Rydberg atoms", Physical Review X 12(2): 021049 (2022).
Couvert et al., "Optimal transport of ultracold atoms in the non-adiabatic regime" Europhysics Letters, 83: 5 pages (2008).
Dordevic et al., "Entanglement transport and a nanophotonic interface for atoms in optical tweezers" arXiv: 16 pages (2021).
Fowler et al., "Surface code quantum communication" arXiv, pp. 1-4 (2010).
Fowler et al., "Surface Codes: Towards practical large-scale quantum computation" Physical Review, vol. 86 (3), p. 1-54 (2012).
Graham et al., "Demonstration of multi-qubit entanglement and algorithms on a programmable neutral atom quantum computer" arXiv, p. 1-25 (2022).
Hashizume et al., "Deterministic Fast Scrambling with Neutral Atom Arrays" Physical Review Letters, vol. 126: 14 pages (2021).
International Search Report and Written Opinion for Application No. PCT/US2021/060136 dated Aug. 11, 2022.
International Search Report and Written Opinion for International Application No. PCT/US2022/031297 dated Feb. 21, 2023.
International Search Report and Written Opinion of Application No. PCT/US2021/060138 dated Aug. 19, 2022.
Kaufman et al., "Quantum thermalization through entanglement in an isolated many-body system" arXiv: 19 pages (2016).
Labuhn et al., "Realizing quantum Ising models in tunable two-dimensional arrays of single Rydberg atoms" arXiv: 1-12 (2016).
Lengwenus et al., "Coherent Transport of Atomic Quantum in a Scalable Shift Register" Physical Review Letters, 105: 4 pages (2010).
Low et al., "Practical trapped-ion protocols for universal qudit-based quantum computing", Physical Review Research 2(3): 033128 (2020).
Rehn et al., "A fractionalised "Z2" classical Heisenberg spin liquid" arXiv: 5 pages (2016).
Reichle et al., "Transport Dynamics of single ions in segmented microstructed Paul trap arrays" Forschritte der Physik Progress of Physics, 54 (8-10): 666-685 (2006).
Satzinger et al. "Realizing topologically ordered states on a quantum processor," 27 pages, (2021).
Savary et al., "Quantum Spin Liquids" arXiv: 60 pages (2016).
Yang et al., "Coherence Preservation of a Single Neutral Atom Qubit Transferred between Magic-Intensity Optical Traps" Physical Review Letter, 117: 6 pages (2016).
Yoder et al., "Universal fault-tolerant gates on concatenated stabilizer codes", Physical Review X 6(3): 031039 (2016).
Du et al., "Superconducting circuit probe for analog quantum simulators", *Physical Review A* 92(1): 012330 (2015).
International Search Report and Written Opinion for Application No. PCT/US2022/039189 dated Aug. 4, 2023.
International Search Report and Written Opinion for International Application No. PCT/US22/37325 dated Jun. 16, 2023.
Keating et al., "Adiabatic quantum computation with Rydberg-dressed atoms", Physical Review A 87, 052314, May 2013.

(56) References Cited

OTHER PUBLICATIONS

Levine, "Quantum Information Processing and Quantum Simulation with Programmable Rydberg Atom Arrays" The Department of Physics at Harvard University, PHD Thesis (2021).
Meschede, "Quantum engineering with neutral atoms one by one", *Conference on Lasers and Electro-Optics/Pacific Rim*. Optica Publishing Group, 2007.
Wang et al., "Quantum state manipulation of single-Cesium-atom qubit in a micro-optical trap", *Frontiers of Physics* 9: 634-639 (2014).
Willner et al., "Optics and photonics: Key enabling technologies", *Proceedings of the IEEE* 100.Special Centennial Issue: 1604-1643 (2012).
Aliferis et al., "Computation by measurements: A unifying picture," Arxiv: 13 pages (2004).
Anonymous., "Magneto-optical trap," Wikipedia, retrieved online <https://web.archive.org/web/20210125084412/https://en.wikipedia.org/wiki/Magneto-optical_trap>: 7 pages (2022).
Cong et al., "Quantum convolutional neural networks" Nature Physics, vol. 15, p. 1273-78 (2019).
Extended European Search Report for EP Application No. 19854402.5 dated May 9, 2022.
Extended European Search Report for EP Application No. 19868908.5 dated Jun. 13, 2022.
Grant et al., "Hierarchical quantum classifiers" ARXIV, p. 1-16 (2018).
International Search Report and Written Opinion for International Application No. PCT/US2022/016173 dated May 24, 2022.
Killoran et al., "Continuous-variable quantum neural networks" ARXIV, p. 1-21 (2018).
Kim and Swingle., "Robust entanglement renormalization on a noisy quantum computer" ARXIV, p. 1-17 (2017).
Morgado et al., "Quantum simulation and computing with Rydberg-interacting qubits," Arxiv, Cornell University Library: 36 pages (2020).
Tanasittikosol et al., "Microwave dressing of Rydberg dark states," Arxiv, Cornell University Library: 12 pages (2011).
Verdon et al., "A Universal Training Algorithm for Quantum Deep Learning" ARXIV, p. 1-83, (2018).
Wu et al., "Erasure conversion for fault-tolerant quantum computing in alkaline earth Rydberg atom arrays," arXiv.org: 16 pages (2022).
Adachi et al., "Application of Quantum Annealing to Training of Deep Neural Networks," arXiv.org: 18 pages (2015).
International Search Report and Written Opinion for International Application No. PCT/US2019/054831 dated Feb. 6, 2020.
Barredo et al., "An atom-by-atom assembler of defect-free arbitrary 2d atomic arrays," arXiv:1607.03042, Jul. 11, 2016, pp. 1-7.
Barredo et al., "An atom-by-atom assembler of defect-free arbitrary two-dimensional atomic arrays," Science, 354(6315): 1021-1023 (2016).
Barredo et al., "Synthetic three-dimensional atomic structures assembled atom by atom," Nature, 561: 79-82 (2018).
Baur et al., "Single-Photon Switch Based on Rydberg Blockade," Phys. Rev. Lett., 112: 073901 (2014).
Brion et al., "Quantum Computing with Collective Ensembles of Multilevel Systems," Phys. Rev. Lett., 99: 260501 (2007).
Browaeys et al., "Many-body physics with individually controlled Rydberg atoms," Nature Physics, 16: 132-142 (2020).
Bruzewicz et al., "Trapped-Ion Quantum Computing: Progress and Challenges," Applied Physics Reviews, 6(2): 021314 (2019).
Debnath et al., "Demonstration of a small programmable quantum computer with atomic qubits," Nature, 536(7614): 63-66 (2016).
Ebert et al., "Coherence and Rydberg Blockade of Atomic Ensemble Qubits," Phys. Rev. Lett., 115: 093601 (2015).
Endres et al., "Atom-by-atom assembly of defect-free one-dimensional cold atom arrays," Science, 354 (6315): 1024-1027 (2016).
Endres et al., "Cold Matter Assembled Atom-by-Atom," arXiv:1607.03044, Jul. 11, 2016, pp. 1-12.
Engstrom et al., "Calibration of spatial light modulators suffering from spatially varying phase response," Optics Express, 21(13): 16086-16103 (2013).
Extended European Search Report for EP Application No. EP 18831504 mailed Mar. 30, 2021.
Farhi et al., "Classification with Quantum Neural Networks on Near Term Processors," arXiv:1802.06002, 1-21 (2018).
Fienup., "Phase retrieval algorithms: a comparison," Applied Optics 21(15): 2758-2769 (1982).
Fowler et al., "Surface codes: Towards practical large-scale quantum computation," Phys. Rev. A, 86: 032324 (2012).
Gerchberg et al., "A Practical Algorithm for the Determination of Phase from Image and Diffraction Plane Pictures," Optik, 35(2): 237-246 (1972).
Gorniaczyk et al., "Single-Photon Transistor Mediated by Interstate Rydberg Interactions," Phys. Rev. Lett., 113: 053601 (2014).
Gunter et al., "Interaction Enhanced Imaging of Individual Rydberg Atoms in Dense Gases," Phys. Rev. Lett., 108: 013002 (2012).
Gunter et al., "Observing the Dynamics of Dipole-Mediated Energy Transport by Interaction-Enhanced Imaging," Science, 342(6161): 954-956 (2013).
Haegeman et al., "Order Parameter for Symmetry-Protected Phases in One Dimension," Phys. Rev. Lett., 109(5): 050402-1-5 (2012).
Haldane, "Nonlinear Field Theory of Large-Spin Heisenberg Antiferromagnets: Semiclassically Quantized Solitons of the One-Dimensional Easy-Axis Neel State," Phys. Rev. Lett., 50(15): 1153-1156 (1983).
International Search Report and Written Opinion for International Application No. PCT/US18/42080 dated Oct. 22, 2018.
International Search Report and Written Opinion for International Application No. PCT/US2019/049115 dated Jan. 7, 2020.
International Search Report and Written Opinion for International Application No. PCT/US2020/019309 dated Jul. 14, 2020.
International Search Report and Written Opinion for International Application No. PCT/US2020/033100 dated Sep. 2, 2020.
International Search Report and Written Opinion for International Application No. PCT/US2020/041709 dated Oct. 28, 2020.
International Search Report and Written Opinion for International Application No. PCT/US2021/012209 mailed May 3, 2021.
Isenhower et al., "Demonstration of a neutral atom controlled-NOT quantum gate," arXiv:0907.5552, Nov. 24, 2009, pp. 1-5.
Jahromi et al., "Topological spin liquids in the ruby lattice with anisotropic Kitaev interactions," Physical Review B, 94(12): (10 pages) (2016).
Jahromi et al., "Topological $Z_2$ RVB quantum spin liquid on the ruby lattice," Physical Review B, 101(11): (10 pages) (2020).
Jaksch et al., "The cold atom Hubbard toolbox," Arxiv, (30 pages) (2004).
Johnson et al., "Rabi Oscillations between Ground and Rydberg States with Dipole-Dipole Atomic Interactions," Physical Review Letters, 110(11): 113003-1-4 (2008).
Kaufman et al., "Hong-Ou-Mandel atom interferometry in tunnel-coupled optical tweezers," arXiv:1312.7182, Jun. 17, 2014, pp. 1-17.
Labuhn et al., "Tunable two-demensional arrays of single Rydberg atoms for realizing quantum Ising models," Nature, 534(7609): 667-670 (2016).
Leonardo et al., "Computer generation of optimal holograms for optical trap arrays," Optics Express, 15(4): 1913-1922 (2007).
Lester et al., "Rapid production of uniformly-filled arrays of neutral atoms," arXiv:1506.04419, Jun. 14, 2015, pp. 1-5.
Lu et al., "Aluminum nitride integrated photonics platform for the ultraviolet to visible spectrum," Optics Express, 26(9): 11147 (2018).
Ma et al., "Generation of three-dimensional optical structures by dynamic holograms displayed on a twisted nematic liquid crystal display," Applied Physics B Lasers and Optics, 110(4): 531-537 (2013).
Matsumoto et al., "High-quality generation of a multispot pattern using a spatial light modulator with adaptive feedback," Optics Letters, 37(15): 3135-3137 (2012).
Mazurenko, "Optical Imaging of Rydberg Atoms," Thesis (S.B.)—Massachusetts Institute of Technology, Dept. of Physics (2012).

(56) References Cited

OTHER PUBLICATIONS

Mehta et al., "Towards fast and scalable trapped-ion quantum logic with integrated photonics," Proc. SPIE 10933, Advances in Photonics of Quantum Computing, Memory, and Communication XII, 109330B (2019).

Murmann et al., "Two Fermions in a Double Well: Exploring a Fundamental Building Block of the Hubbard Model," arXiv:1410.8784, Feb. 17, 2015, pp. 1-12.

Negretti et al., "Quantum computing implementation with neutral particles," Arxiv, (19 pages) (2011).

Nogrette et al., "Single-Atom Trapping in Holographic 2D Arrays of Microtraps with Arbitrary Geometries," Physical Review X, 4: Article 021034 pp. 1-9 (2014).

Perez-Garcia et al., "PEPS as unique ground states of local Hamiltonians," Quant. Inf. Comp., 8: 0650 (2008).

Persson et al., "An algorithm for improved control of trap intensities in holographic optical tweezers," Proceedings of SPIE, 8458: 8 pages (2012).

Persson et al., "Minimizing intensity fluctuations in dynamic holographic optical tweezers by restricted phase change," Optics Express, 18(11): 11250-11263 (2010).

Persson et al., "Real-time generation of fully optimized holograms for optical trapping applications," Proceedings of SPIE, 8097: 10 pages (2011).

Persson et al., "Reducing the effect of pixel crosstalk in phase only spatial light modulators," Optics Express, 20(20): 22334-22343 (2012).

Persson., "Thesis for the Degree of Doctor of Philosophy: Advances in Holographic Optical Trapping," Department of Physics University o Gothenburg: 82 pages (2013).

Pichler et al., "Computational complexity of the Rydberg blockade in two dimensions," arXiv: 1809.04954 (2018).

Poland et al., "Development of a doubly weighted Gerchberg-Saxton algorithm for use in multibeam imaging applications," Optics Letters, 39(8): 2431-2434 (2014).

Pollmann et al., "Detection of symmetry-protected topological phases in one dimension," Phys. Rev. B, 86(12): 125441-1-13 (2012).

Prongue et al., "Optimized kinoform structures for highly efficient fan-out elements," Applied Optics, 31(26): 5706-5711 (1992).

Saffman et al., "Quantum information with Rydberg atoms," Rev. Mod. Phys., 82(3): 2313-2363 (2010).

Saffman et al., "Scaling the neutral-atom Rydberg gate quantum computer by collective encoding in holmium atoms," Phys. Rev. A, 78: 012336 (2008).

Shi, "Deutsch, Toffoli, and CNOT Gates via Rydberg Blockade of Neutral Atoms," Arxiv.org, Cornell University Library, 201 Olin Library Cornell University Ithaca, NY (2018).

Shi, "Fast, Accurate, and Realizable Two-Qubit Entangling Gates by Quantum Interference in Detuned Rabi Cycles of Rydberg Atoms," Arxiv.org, Cornell University Library, 201 Olin Library Cornell University Ithaca, NY (2019).

Sorace-Agaskar et al., "Multi-layer integrated photonics from the ultraviolet to the infrared," Proc. SPIE 10510, Frontiers in Biological Detection: From Nanosensors to Systems X, 105100D (2018).

Tamura et al., "Highly uniform holographic microtrap arrays for single atom trapping using a feedback optimization of in-trap fluorescence measurements," Optics Express, 24(8): 8132-8141 (2016).

Thimons et al., "Investigating the Gerchberg-Saxton Phase Retrieval Algorithm," SIAM: 11 pages (2018).

Torlai et al., "Integrating Neural Networks with a Quantum Simulator for State Reconstruction," Cornell University Library, (15 pages) (2019).

Urban et al., "Observation of Rydberg blockade between two atoms," Nature Physics, 5: 110-114 (2009).

Verresen et al., "One-dimensional symmetry protected topological phases and their transitions," Phys. Rev. B, 96(16): 165124-1-23 (2017).

Verstraete et al., "Criticality, the Area Law, and the Computational Power of Projected Entangled Pair States," Phys. Rev. Lett., 96: 220601 (2006).

Vidal, "Class of Quantum Many-Body States That Can Be Efficiently Simulated," Phys. Rev. Lett., 101(11): 110501-1-4 (2008).

Wang et al., "Coherent Addressing of Individual Neutral Atoms in a 3D Optical Lattice," Physical Review Letters, 115(4): 043003-1-5 (2015).

Yavuz et al., "Fast Ground State Manipulation of Neutral Atoms in Microscopic Optical Traps," Physical Review Letters, 96(6): 063001-1-4 (2006).

Ying, "Entangled Many-Body States as Resources of Quantum Information Processing," Center for Quantum Technologies National University of Singapore (2013).

Zimmermann et al., "High-resolution imaging of ultracold fermions in microscopically tailored optical potentials," arXiv:1011.1004, Apr. 8, 2011, pp. 1-15.

International Search Report and Written Opinion for International Application No. PCT/US23/26737 dated Sep. 30, 2024.

Jaksch et al., "Fast quantum gates for neutral atoms." arXiv (2000): 2208.

Keating et al., "Robust quantum logic in neutral atoms via adiabatic Rydberg dressing." Physical Review A 91 (2015): 012337.

Monroe et al., "Remapping the quantum frontier." Physics World 21.08 (2008): 32.

Nickerson et al., "Freely scalable quantum technologies using cells of 5-to-50 qubits with very lossy and noisy photonic links." Physical Review X 4.4 (2014): 041041.

Ramette et al., "Fault-tolerant connection of error-corrected qubits with noisy links." npj Quantum Information 10.1 (2024): 58.

Weimer et al. "A Rydberg quantum simulator." Nature Physics 6.5 (2010): 382-388.

\* cited by examiner

QUANTUM CONVOLUTIONAL NEURAL NETWORKS

RELATED APPLICATIONS

This application is the national stage of International Application No. PCT/US2019/054831, filed Oct. 4, 2019, which claims the benefit of priority to United States Provisional Application Ser. No. 62/742,100, filed Oct. 5, 2018, the contents of each of which is incorporated by reference.

GOVERNMENT SUPPORT

This invention was made with government support under 1734011 awarded by National Science Foundation (NSF) and under N00014-15-1-2846 awarded by U.S. Office of Naval Research (NAVY/ONR). The government has certain rights in this invention.

INCORPORATION BY REFERENCE

All patents, patent applications and publications cited herein are hereby incorporated by reference in their entirety in order to more fully describe the state of the art as known to those skilled therein as of the date of the invention described herein.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

TECHNICAL FIELD

This patent relates to quantum computing, and more particularly to quantum convolutional neural networks.

BACKGROUND

Machine learning is a type of algorithm, method, or computer system that can perform tasks without receiving explicit instructions to do so. In some machine learning examples, an algorithm is trained on a set of test data such that it can later perform an intended task on other data. Example machine learning algorithms and techniques include supervised/unsupervised learning, reinforcement learning, feature learning, sparse dictionary learning, anomaly detection, association rules, and modeled algorithms.

A neural network is an example machine learning algorithm that mimics the biological neural networks found in animal brains. Large-scale neural networks have successfully solved classically difficult problems such as image recognition or optimization of classical error correction, and their architectures have been related to various physical concepts, such as an animal brain.

SUMMARY

In some embodiments a method includes convolving a plurality of input qudits in a classical or quantum state by applying at least one convolving layer of quantum channels to convolving subgroups of the plurality of input qudits, wherein the size of each convolving subgroup of the plurality of input qudits is independent of the number of the plurality of input qudits; pooling the plurality of input qudits by applying at least one pooling layer comprising: dividing the plurality of input qudits into pooling subgroups of the plurality of input qudits, wherein the size of each pooling subgroup of the plurality of input qudits is independent of the number of the plurality of input qudits, and the qudits in each pooling subgroup are in proximity to each other, and within each pooling subgroup of the plurality of input qudits, performing a pooling layer generalized measurement of the state of a subset of one or more input qudits, and applying at least one quantum channel to at least some of the input qudits in the pooling subgroup on which the pooling layer generalized measurement has not been performed based on the outcome of the pooling layer generalized measurement of the state of the subset of the one or more input qudits in the pooling subgroup; repeating said convolving and said pooling at least once to the plurality of input qudits on which a pooling layer generalized measurement has not been performed; applying a fully connected quantum channel to a subgroup of input qudits on which a pooling layer generalized measurement has not been performed, wherein the size of the selected subgroup is independent of the number of the plurality of input qudits; and performing a final generalized measurement of the state of at least some of the input qudits on which a pooling layer generalized measurement has not been performed, wherein the outcome of the final generalized measurement is indicative of the classical or quantum state of the plurality of input qudits.

In some embodiments, one or more of the pooling layer generalized measurements and the final generalized measurement comprises projecting the qudits into a subspace in a complete set of orthogonal subspaces.

In some embodiments, the outcome of one or more of the pooling layer generalized measurements and the final generalized measurement comprises the subspace in which the one or more qudits was projected.

In some embodiments, for the one or more of the pooling layer generalized measurements and the final generalized measurement, each subspace in the corresponding complete set of orthogonal subspaces has dimension equal to one.

In some embodiments, each subspace of dimension equal to one is spanned by a basis state which is a product state of single-qudit states in a computational basis of the qudits.

In some embodiments, the plurality of input qudits are qubits.

In some embodiments, the quantum channels are unitaries.

In some embodiments, the qudits in each convolving subgroup are in proximity to each other.

In some embodiments, the at least one convolving layer is translationally invariant.

In some embodiments, the at least one pooling layer is translationally invariant.

In some embodiments, one or more of the quantum channels in the at least one convolving layer, the quantum channels in the at least one pooling layer, the fully connected quantum channel, the pooling layer generalized measurements, and the final generalized measurement is parametrized using at least one variational parameter.

In some embodiments, the at least one variational parameter is optimized to minimize a cost function having a cost value that depends on the at least one variational parameter and on at least one training set.

In some embodiments, said repeating said convolving comprises applying at least one additional convolving layer of quantum channels to additional convolving subgroups of the plurality of input qudits on which a pooling layer generalized measurement has not been performed, at least one of the quantum channels in the at least one additional convolving layer being different from at least one of the quantum channels in the at least one convolving layer.

In some embodiments, said repeating said pooling comprises applying at least one additional pooling layer, one or more of at least one of the quantum channels and the pooling layer generalized measurements in the at least one additional pooling layer being different from one or more of at least one of the quantum channels and the pooling layer generalized measurements in the at least one pooling layer.

In some embodiments, said repeating said convolving comprises applying at least one additional convolving layer of quantum channels to additional convolving subgroups of the plurality of input qudits on which a pooling layer generalized measurement has not been performed, the additional convolving subgroups being different from the convolving subgroups to which the at least one convolving layer of quantum channels was applied.

In some embodiments, said repeating said pooling comprises applying at least one additional pooling layer, one or more of the at least one of the quantum channels and the pooling layer generalized measurements in the at least one additional pooling layer being different from one or more of at least one of the quantum channels and the pooling layer generalized measurements in the at least one pooling layer.

In some embodiments, said repeating said convolving comprises applying at least one additional convolving layer of quantum channels to additional convolving subgroups of the plurality of input qudits on which a pooling layer generalized measurement has not been performed, the additional convolving subgroups being different from the convolving subgroups to which the at least one convolving layer of quantum channels was applied.

In some embodiments, said repeating said pooling comprises applying at least one additional pooling layer, one or more of at least one of the quantum channels and the pooling layer generalized measurements in the at least one additional pooling layer being different from one or more of at least one of the quantum channels and the pooling layer generalized measurements in the at least one pooling layer.

In some embodiments, said repeating said pooling comprises applying at least one additional pooling layer, one or more of at least one of the quantum channels and the pooling layer generalized measurements and the pooling subgroups in the at least one additional pooling layer being different from one or more of at least one of the quantum channels and the pooling subgroups and the pooling layer generalized measurements in the at least one pooling layer.

In some embodiments, the number of times the said convolving and said pooling are repeated is not dependent on the classical or quantum state of the plurality of input qudits or any intermediate state.

In some embodiments, the quantum channels in the at least one convolving layer are not dependent on the classical or quantum state of the plurality of input qudits or any intermediate state.

In some embodiments, the quantum channels in the at least one pooling layer are not dependent on the classical or quantum state of the plurality of input qudits or any intermediate state.

In some embodiments, each convolving subgroup comprises at most four qudits.

In some embodiments, each pooling subgroup comprises at most four qudits.

In some embodiments, the plurality of input qudits comprises neutral atoms interacting via Rydberg states.

In some embodiments, the method further includes determining, based on the outcome of the final generalized measurement, a phase of matter to which the plurality of input qudits belongs.

In some embodiments, the method further includes determining, based on the outcome of the final generalized measurement, a class of classical or quantum states to which the plurality of input qudits belongs.

In some embodiments, a method includes convolving a plurality of input qudits in a classical or quantum state by applying at least one convolving layer of quantum channels to convolving subgroups of the plurality of input qudits, wherein the size of each convolving subgroup of the plurality of input qudits is independent of the number of the plurality of input qudits; pooling the plurality of input qudits by applying at least one pooling layer comprising: dividing the plurality of input qudits into pooling subgroups of the plurality of input qudits, wherein the size of each pooling subgroup of the plurality of input qudits is independent of the number of the plurality of input qudits, and the qudits in each pooling subgroup are in proximity to each other, and within each pooling subgroup of the plurality of input qudits, applying a controlled-quantum-channel to the qudits in the pooling subgroup, wherein a selected subset of qudits in each pooling subgroup are control qudits and the remaining qudits in the pooling subgroup are the target qudits, and disregarding the selected subset of control qudits for the remainder of the method; repeating said convolving and said pooling at least once to the plurality of input qudits that have not been disregarded; applying a fully connected quantum channel to a selected subgroup of qudits that have not been previously disregarded, wherein the size of the selected subgroup is independent of the number of the plurality of input qudits; performing a generalized measurement of the state of at least some of the input qudits, wherein the outcome of the generalized measurement is indicative of the classical or quantum state of the plurality of input qudits.

In some embodiments, the generalized measurement comprises projecting the at least some of the input qudits into a subspace in a complete set of orthogonal subspaces.

In some embodiments, the outcome of the generalized measurement comprises the subspace in which the at least some of the input qudits was projected.

In some embodiments, for the generalized measurement, each subspace in the corresponding complete set of orthogonal subspaces has dimension equal to one.

In some embodiments, each subspace of dimension equal to one is spanned by a basis state which is a product state of single-qudit states in a computational basis of the qudits.

In some embodiments, one or more of the at least one pooling layer and the at least one repeated pooling layer further comprises performing a pooling layer generalized measurement of the state of at least one of the disregarded control qudits after applying the at least one controlled-quantum-channel, wherein the pooling layer generalized measurement of the state of the at least one of the disregarded control qudits comprises projecting the at least one of the disregarded control qudits into a subspace in a complete set of orthogonal subspaces, the outcome of the pooling layer generalized measurement comprising the subspace in which the one or more qudits was projected.

In some embodiments, for each pooling layer generalized measurement, each subspace in the corresponding complete set of orthogonal subspaces has dimension equal to one.

In some embodiments, each subspace of dimension equal to one is spanned by a basis state which is a product state of single-qudit states in a computational basis of the qudits.

In some embodiments, the plurality of input qudits are qubits.

In some embodiments, the quantum channels are unitaries.

In some embodiments, the qudits in each convolving subgroup are in proximity to each other.

In some embodiments, the at least one convolving layer is translationally invariant.

In some embodiments, the at least one pooling layer is translationally invariant.

In some embodiments, one or more of the quantum channels in the at least one convolving layer, the quantum channels in the at least one pooling layer, the fully connected quantum channel, and the generalized measurement is parametrized using at least one variational parameter.

In some embodiments, the at least one variational parameter is optimized to minimize a cost function having a cost value that depends on the at least one variational parameter and on at least one training set.

In some embodiments, said repeating said convolving comprises applying at least one additional convolving layer of quantum channels to additional convolving subgroups of the plurality of input qudits that have not been disregarded, at least one of the quantum channels in the at least one additional convolving layer being different from at least one of the quantum channels in the at least one convolving layer.

In some embodiments, said repeating said pooling comprises applying at least one additional pooling layer, at least one of the quantum channels in the at least one additional pooling layer being different from at least one of the quantum channels in the at least one pooling layer.

In some embodiments, said repeating said convolving comprises applying at least one additional convolving layer of quantum channels to additional convolving subgroups of the plurality of input qudits that have not been disregarded, the additional convolving subgroups being different from the convolving subgroups to which the at least one convolving layer of quantum channels was applied.

In some embodiments, said repeating said pooling comprises applying at least one additional pooling layer, at least one of the quantum channels in the at least one additional pooling layer being different from at least one of the quantum channels in the at least one pooling layer.

In some embodiments, said repeating said convolving comprises applying at least one additional convolving layer of quantum channels to additional convolving subgroups of the plurality of input qudits that have not been disregarded, the additional convolving subgroups being different from the convolving subgroups to which the at least one convolving layer of quantum channels was applied.

In some embodiments, said repeating said pooling comprises applying at least one additional pooling layer, at least one of the quantum channels in the at least one additional pooling layer being different from at least one of the quantum channels in the at least one pooling layer.

In some embodiments, said repeating said pooling comprises applying at least one additional pooling layer, at least one of the quantum channels in the at least one additional pooling layer being different from the at least one of the quantum channels in the at least one pooling layer.

In some embodiments, the number of times said convolving and said pooling are repeated is not dependent on the classical or quantum state of the plurality of input qudits or any intermediate state.

In some embodiments, quantum channels in the at least one convolving layer are not dependent on the classical or quantum state of the plurality of input qudits or any intermediate state.

In some embodiments, the quantum channels in the at least one pooling layer are not dependent on the classical or quantum state of the plurality of input qudits or any intermediate state.

In some embodiments, each convolving subgroup comprises at most four qudits.

In some embodiments, each pooling subgroup comprises at most four qudits.

In some embodiments, the plurality of input qudits comprises neutral atoms interacting via Rydberg states.

In some embodiments, the method further includes determining, based on the outcome of the generalized measurement, a phase of matter to which the plurality of input qudits belongs.

In some embodiments, the method further includes determining, based on the outcome of the generalized measurement, a class of classical or quantum states to which the plurality of input qudits belongs.

In some embodiments, a method includes: providing a set C of qudits susceptible to noise, wherein the qudits in the set C are input logical qudits; enlarging the set C of qudits to include a set A of additional qudits, wherein the additional qudits are prepared in a determined state and the number of additional qudits is independent of the total number of qudits; applying a fully connected unitary F to the set C of qudits; initializing, in a computer readable storage medium, an empty list L of information about at least one property of applied expansion layers and applied convolving layers; expanding the set C of qudits by applying at least one expansion layer to the set C of qudits, each expansion layer comprising: dividing the set C of qudits into expansion subgroups of qudits, wherein the size of each expansion subgroup is independent of the total number of qudits, for each expansion subgroup, forming a set S of qudits comprising expansion subgroup qudits and at least one expansion qudit, wherein the at least one expansion qudit is prepared in a determined state and the number of the at least one expansion qudit is independent of the total number of qudits, applying a unitary to the set S of qudits, and enlarging the set C to include the at least one expansion qudit, and appending information about at least one property of the at least one expansion layer to the list L in the computer readable storage medium; convolving the set C of qudits by: applying at least one convolving layer of unitaries U to convolving subgroups of the set C, wherein the size of each convolving subgroup of the set C is independent of the total number of qudits, and appending information about at least one property of the at least one convolving layer to the list L in the computer readable storage medium in the order in which the at least one convolving layer was applied; repeating said expanding and said convolving at least once to the set C of qudits; applying to the set C of qudits inverse layers of the previously applied expansion and convolving layers in the opposite order of which the layers were applied, wherein the inverse layers comprise: at least one inverse convolving layer based on the information about the at least one property of the corresponding at least one convolving layer in the list L, each inverse convolving layer comprising, for each unitary applied in the corresponding convolving layer, applying the inverse of U to the convolving subgroup to which U was applied in the corresponding convolving layer, wherein the order of applying the inverses of the unitaries U is the reverse of the order in which the unitaries U were applied in the corresponding convolving layer, and at least one inverse expansion layer based on the information about the at least one property of the corresponding at least one expansion layer in the list L, each inverse expansion layer comprising, for each expansion subgroup of the corresponding expansion layer: forming the set S of qudits comprising the expansion subgroup qudits and the corresponding at least one expansion qudit, applying the inverse of the unitary that was applied to the set S of qudits in the corresponding expansion layer, performing an inverse expansion layer generalized measurement of the corresponding at least one expansion qudit, applying a unitary to the expansion subgroup qudits based on the outcome of the inverse expansion layer generalized measurement of the corresponding at least one expansion qudit, and removing the corresponding at least one expansion qudit from the set C of qudits, applying the inverse of the fully connected unitary F to the set C of qudits; and performing a final generalized measurement of the additional qudits in the set A, wherein the qudits remaining in the set C which do not belong to the set A correspond to error-corrected input logical qudits.

In some embodiments, the inverse expansion layer generalized measurement of the corresponding at least one expansion qudit comprises projecting the corresponding at least one expansion qudit into a subspace in a complete set of orthogonal subspaces, wherein one of the orthogonal subspaces contains the determined state in which the corresponding at least one expansion qudit was prepared.

In some embodiments, the outcome of the inverse expansion layer generalized measurement of the corresponding at least one expansion qudit is the subspace in which the corresponding at least one expansion qudit was projected.

In some embodiments, the final generalized measurement of the additional qudits in the set A comprises projecting the additional qudits in the set A into a subspace in a complete set of orthogonal subspaces, wherein one of the orthogonal subspaces contains the determined state in which the additional qudits in the set A were prepared.

In some embodiments, for the final generalized measurement, each subspace in the corresponding complete set of orthogonal subspaces has dimension equal to one.

In some embodiments, each subspace of dimension equal to one is spanned by a basis state which is a product state of single-qudit states in a computational basis of the qudits.

In some embodiments, the method further includes removing the additional qudits in the set A from the set C of qudits after the final generalized measurement of the additional qudits in the set A.

In some embodiments, one or more of the unitaries in the at least one expansion layer, the unitaries in the at least one convolving layer, the unitaries in the at least one inverse expansion layer, the unitaries in the at least one inverse convolving layer, the inverse fully connected unitary, the fully connected unitary F, the inverse expansion layer generalized measurements, and the final generalized measurement is optimized for a noise model to which the set C of qudits is susceptible.

In some embodiments, one or more of the unitaries in the at least one expansion layer, the unitaries in the at least one convolving layer, the unitaries in the at least one inverse expansion layer, the unitaries in the at least one inverse convolving layer, the inverse fully connected unitary, the fully connected unitary F, the inverse expansion layer generalized measurements, and the final generalized measurement is parametrized using at least one variational parameters optimized for a noise model to which the set C of qudits is susceptible.

In some embodiments, the input logical qudits, the additional qudits in the set A, and the at least one expansion qudit are qubits.

In some embodiments, the qudits in each convolving subgroup are in proximity to each other.

In some embodiments, one or more of the at least one convolving layer and the at least one corresponding inverse convolving layer is translationally invariant.

In some embodiments, one or more of the at least one expansion layer and the at least one corresponding inverse expansion layer is translationally invariant.

In some embodiments, said repeating said convolving the set C of qudits comprises applying at least one additional convolving layer of unitaries to additional convolving subgroups of the set C of qudits, at least one of the unitaries in the at least one additional convolving layer being different from at least one of the unitaries in the at least one convolving layer of unitaries.

In some embodiments, said repeating said expanding the set C of qudits comprises applying at least one additional expansion layer, one or more of at least one of the unitaries and the expansion subgroups in the at least one additional expansion layer being different from at least one of the unitaries and the expansion subgroups in one or more of the at least one expansion layer.

In some embodiments, the additional convolving subgroups are different from the convolving subgroups to which the at least one convolving layer of unitaries was applied.

In some embodiments, said repeating said expanding the set C of qudits comprises applying at least one additional expansion layer, one or more of at least one of the unitaries and the expansion subgroups in the at least one additional expansion layer being different from one or more of at least one of the unitaries and the expansion subgroups in the at least one expansion layer.

In some embodiments, said repeating said convolving the set C of qudits comprises applying at least one additional convolving layer of unitaries to additional convolving subgroups of the set C of qudits, the additional convolving subgroups being different from the convolving subgroups to which the at least one convolving layer of unitaries was applied.

In some embodiments, said repeating said expanding the set C of qudits comprises applying at least one additional expansion layer, one or more of at least one of the unitaries and the expansion subgroups in the at least one additional expansion layer being different from one or more of at least one of the unitaries and the expansion subgroups in the at least one expansion layer.

In some embodiments, said repeating said expanding the set C of qudits comprises applying at least one additional expansion layer, one or more of at least one of the unitaries and the expansion subgroups in the at least one additional expansion layer being different from one or more of the at least one of the unitaries and the expansion subgroups in the at least one expansion layer.

In some embodiments, system includes: an energy source configured to selectively apply quantum channels to qudits; a measurement device configured to selectively perform generalized measurements of the state of the qudits; and a controller comprising: a processor operatively coupled to the energy source and the measurement device, and a computer readable storage medium having instructions stored thereon that cause the processor to control the energy source and the measurement device to: convolve a plurality of input qudits in a classical or quantum state by applying, with the energy source, at least one convolving layer of quantum channels to convolving subgroups of the plurality of input qudits, wherein the size of each convolving subgroup of the plurality of input qudits is independent of the number of the plurality of input qudits, pool the plurality of input qudits by applying at least one pooling layer comprising: dividing the plurality of input qudits into pooling subgroups of the plurality of input qudits, wherein the size of each pooling subgroup of the plurality of input qudits is independent of the number of the plurality of input qudits, and the qudits in each pooling subgroup are in proximity to each other, and within each pooling subgroup of the plurality of input qudits, performing, with the measurement device, a pooling layer generalized measurement of the state of a subset of one or more qudits, and applying, with the energy source, at least one quantum channel to at least some of the qudits in the pooling subgroup on which the pooling layer generalized measurement has not been performed based on the outcome of the pooling layer generalized measurement; repeat said convolving and said pooling at least once to the plurality of input qudits on which a pooling layer generalized measurement has not been performed, apply, with the energy source, a fully connected quantum channel to a subgroup of input qudits on which a pooling layer generalized measurement has not been performed, wherein the size of the selected subgroup is independent of the number of the plurality of input qudits, and perform, with the measurement device, a final generalized measurement of the state of at least some of the qudits on which a pooling layer generalized measurement has not been performed, wherein the outcome of the final generalized measurement is indicative of the classical or quantum state of the plurality of input qudits.

In some embodiments, one or more of the pooling layer generalized measurements and the final generalized measurement comprises projecting qudits into a subspace in a complete set of orthogonal subspaces.

In some embodiments, the outcome of the one or more of the pooling layer generalized measurements and the final generalized measurement comprises the subspace in which the one or more qudits was projected.

In some embodiments, for the one or more of the pooling layer generalized measurements and the final generalized measurement, each subspace in the corresponding complete set of orthogonal subspaces has dimension equal to one.

In some embodiments, each subspace of dimension equal to one is spanned by a basis state which is a product state of single-qudit states in a computational basis of the qudits.

In some embodiments, the energy source comprises one or more of at least one laser light source, at least one microwave generator, and at least one magnetic field generator.

In some embodiments, the measurement device comprises one of more of at least one photodetector, at least one microwave resonator, and at least one cavity resonator.

In some embodiments, the plurality of input qudits are qubits.

In some embodiments, one or more of the quantum channels are unitaries.

In some embodiments, the qudits in each convolving subgroup are in proximity to each other.

In some embodiments, the at least one convolving layer is translationally invariant.

In some embodiments, the at least one pooling layer is translationally invariant.

In some embodiments, one or more of the quantum channels in the at least one convolving layer, the quantum channels in the at least one pooling layer, the fully connected quantum channel, the pooling layer generalized measurements, and the final generalized measurement is parametrized using at least one variational parameter.

In some embodiments, the at least one variational parameter is optimized to minimize a cost function having a cost value that depends on the at least one variational parameter and on at least one training set.

In some embodiments, said repeating said convolving comprises applying at least one additional convolving layer of quantum channels to additional convolving subgroups of the plurality of input qudits on which a pooling layer generalized measurement has not been performed, at least one of the quantum channels in the at least one additional convolving layer being different from at least one of the quantum channels in the at least one convolving layer.

In some embodiments, said repeating said pooling comprises applying at least one additional pooling layer, one or more of at least one of the quantum channels in the at least one additional pooling layer and the pooling layer generalized measurements being different from one or more of at least one of the quantum channels and the pooling layer generalized measurements in the at least one pooling layer.

In some embodiments, the additional convolving subgroups are different from the convolving subgroups to which the at least one convolving layer of quantum channels was applied.

In some embodiments, said repeating said pooling comprises applying at least one additional pooling layer, one or more of at least one of the quantum channels and the pooling layer generalized measurements in the at least one additional pooling layer being different from one or more of at least one of the quantum channels and the pooling layer generalized measurements in the at least one pooling layer.

In some embodiments, said repeating said convolving comprises applying at least one additional convolving layer of quantum channels to additional convolving subgroups of the plurality of input qudits on which a pooling layer generalized measurement has not been performed, the additional convolving subgroups being different from the convolving subgroups to which the at least one convolving layer of quantum channels was applied.

In some embodiments, said repeating said pooling comprises applying at least one additional pooling layer, one or more of at least one of the quantum channels and the pooling layer generalized measurements in the at least one additional pooling layer being different from one or more of at least one of the quantum channels and the pooling layer generalized measurements in the at least one pooling layer.

In some embodiments, said repeating said pooling comprises applying at least one additional pooling layer, one or more of at least one of the quantum channels and the pooling layer generalized measurements in the at least one additional pooling layer being different from one or more of the at least one of the quantum channels and the pooling layer generalized measurements in the at least one pooling layer.

In some embodiments, the number of times said convolving and said pooling are repeated is not dependent on the classical or quantum state of the plurality of input qudits or any intermediate state.

In some embodiments, the quantum channels in the at least one convolving layer of quantum channels are not dependent on the classical or quantum state of the plurality of input qudits or any intermediate state.

In some embodiments, the quantum channels in the at least one pooling layer are not dependent on the classical or quantum state of the plurality of input qudits or any intermediate state.

In some embodiments, each convolving subgroup comprises at most four qudits.

In some embodiments, each pooling subgroup comprises at most four qudits.

In some embodiments, the plurality of input qudits comprises neutral atoms interacting via Rydberg states.

In some embodiments, the instructions further cause the processor to determine, based on the outcome of the final generalized measurement, a phase of matter to which the plurality of input qudits belongs.

In some embodiments, the instructions further cause the processor to determine, based on the outcome of the final generalized measurement, a class of classical or quantum states to which the plurality of input qudits belongs.

In some embodiments, a system includes: an energy source configured to selectively apply quantum channels to qudits; a measurement device configured to selectively perform generalized measurements of the state of the qudits; and a controller comprising: a processor operatively coupled to the energy source and the measurement device, and a computer readable storage medium having instructions stored thereon that cause the processor to control the energy source and the measurement device to: convolve a plurality of input qudits in a classical or quantum state by applying, with the energy source, at least one convolving layer of quantum channels to convolving subgroups of the plurality of input qudits, wherein the size of each convolving subgroup of the plurality of input qudits is independent of the total number of the plurality of input qudits, pool the plurality of input qudits by applying at least one pooling layer comprising: dividing the plurality of input qudits into pooling subgroups of the plurality of input qudits, wherein the size of each pooling subgroup of the plurality of input qudits is independent of the number of the plurality of input qudits, and the qudits in each pooling subgroup are in proximity to each other, and within each pooling subgroup of the plurality of input qudits, applying, with the energy source, a controlled-quantum-channel to qudits in the pooling subgroup, wherein a selected subset of qudits are control qudits and the remaining qudits are target qudits, and disregarding the selected subset of control qudits for the remainder of the method, repeat said convolving and said pooling to the plurality of input qudits that have not been disregarded, apply, with the energy source, a fully connected quantum channel to a selected subgroup of the plurality of input qudits that have not been disregarded, wherein the size of the selected subgroup is independent of the number of the plurality of input qudits, and perform, with the measurement device, a generalized measurement of the state of at least some of the input qudits that have not been disregarded, wherein the outcome of the generalized measurement is indicative of the classical or quantum state of the plurality of the plurality of input qudits.

In some embodiments, the generalized measurement comprises projecting the one or more input qudits into a subspace in a complete set of orthogonal subspaces.

In some embodiments, the outcome of the generalized measurement comprises the subspace in which the one or more input qudits was projected.

In some embodiments, for the generalized measurement, each subspace in the corresponding complete set of orthogonal subspaces has dimension equal to one.

In some embodiments, each subspace of dimension equal to one is spanned by a basis state which is a product state of single-qudit states in a computational basis of the qudits.

In some embodiments, a system includes: an energy source configured to selectively apply quantum channels to qudits; a measurement device configured to selectively perform generalized measurements of the state of the qudits; and a controller comprising: a processor operatively coupled to the energy source and the measurement device, and a computer readable storage medium having instructions stored thereon that cause the processor to control the energy source and the measurement device to: enlarge a set C of qudits susceptible to noise to include a set A of additional qudits, wherein the additional qudits are prepared in a determined state and the number of additional qudits is independent of the total number of qudits, apply, with the energy source, a fully connected unitary F to the set C of qudits, initialize, in the computer readable storage medium, an empty list L of information about at least one property of applied expansion layers and applied convolving layers, expand the set C of qudits by applying at least one expansion layer to the set C of qudits, each expansion layer comprising: dividing the set C of qudits into expansion subgroups of qudits, wherein the size of each expansion subgroup is independent of the total number of qudits, for each expansion subgroup, forming a set S of qudits comprising expansion subgroup qudits and at least one expansion qudit, wherein the at least one expansion qudit is prepared in a determined state and the number of the at least one expansion qudit is independent of the total number of qudits, applying, with the energy source, a unitary to the set S of qudits, and enlarging the set C to include the at least one expansion qudit, and appending information about at least one property of the at least one expansion layer to the list L in the computer readable storage medium; convolve the set C of qudits by: applying, with the energy source, at least one convolving layer of unitaries U to convolving subgroups of the set C, wherein the size of each convolving subgroup of the set C is independent of the total number of qudits, and appending information about at least one property of the at least one convolving layer to the list L in the computer readable storage medium in the order in which the at least one convolving layer was applied, repeat said expanding and said convolving at least once to the set C of qudits, apply to the set C of qudits inverse layers of the previously applied expansion and convolving layers in the opposite order of which the layers were applied, wherein the inverse layers comprise: at least one inverse convolving layer based on the information about the at least one property of the corresponding at least one convolving layer in the list L, each inverse convolving layer comprising, for each unitary applied in the corresponding convolving layer, applying, with the energy source, the inverse of U to the convolving subgroup to which U was applied in the corresponding convolving layer, wherein the order of applying the inverses of the unitaries U is the reverse of the order in which the unitaries U were applied in the corresponding convolving layer, and at least one inverse expansion layer based on the information about the at least one property of the at least one corresponding expansion layer in the list L, each inverse expansion layer comprising, for each expansion subgroup of the corresponding expansion layer, forming the set S of qudits comprising the expansion subgroup qudits and the corresponding at least one expansion qudit, applying, with the energy source, the inverse of the unitary that was applied to the set S of qudits in the corresponding expansion layer, performing, with the measurement device, an inverse expansion layer generalized measurement of the corresponding at least one expansion qudit, applying, with the energy source, a unitary to the expansion subgroup qudits based on the outcome of the inverse expansion layer generalized measurement of the corresponding at least one expansion qudit, and removing the corresponding at least one expansion qudit from the set C of qudits, apply, with the energy source, the inverse of the fully connected unitary F to the set C of qudits, and perform, with the measurement device, a final generalized measurement of the additional qudits in the set A, wherein the qudits remaining in the set C which do not belong to the set A correspond to error-corrected input logical qudits.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figures 1A, 1B:
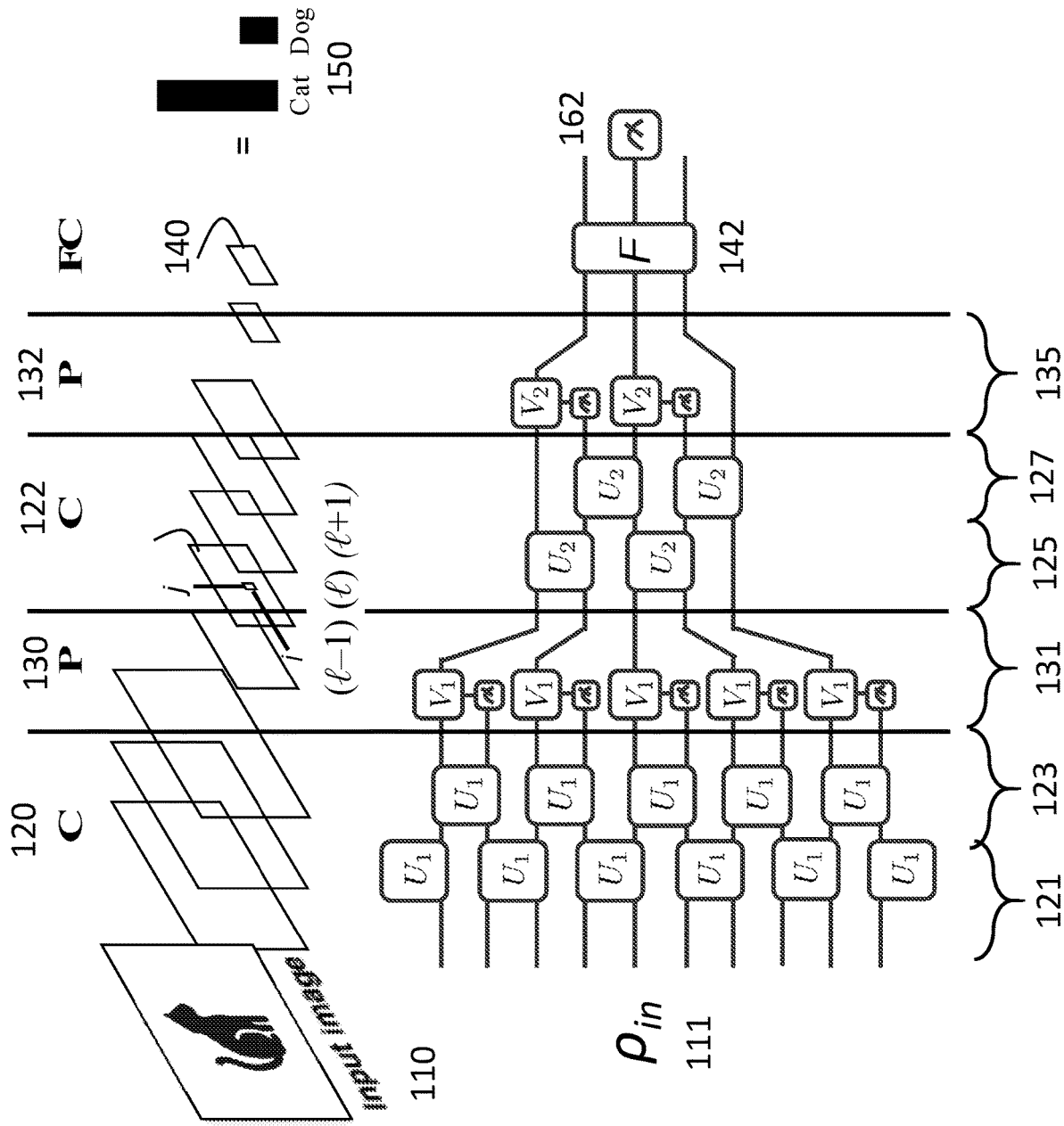
FIG. 1A is a diagram showing a classical convolutional neural network.
FIG. 1B is a diagram showing an example quantum convolutional neural network circuit, according to some embodiments.

The direct application of classical machine learning algorithms, such as neural networks, is challenging to implement for intrinsically quantum problems, which can take quantum states or processes as inputs, or can take advantage of quantum mechanical interactions to produce a solution. In some examples, the extremely large many-body Hilbert space hinders the efficient translation of such problems into a classical framework without performing exponentially difficult quantum state or process tomography.

Aspects of the present disclosure relate to a machine learning-inspired quantum circuit model, such as a quantum convolutional neural network ("QCNN") circuit model. A QCNN circuit can be trained on sets of training data, such as qudits in a particular state, and then applied to new data, such as qudits in a different state. In some embodiments, QCNN can involve receiving an input of qudits and performing multiple layers of processing across the qudits. For example, each layer can involve convolving subsets of the qudits and pooling the qudits to reduce the number of qudits considered, and the final layer can be fully connected. After the final layer, the final state of the remaining qudits can be measured. In some embodiments, convolving subsets of the qudits, pooling the qudits, and the fully connected layer can involve application of quantum channels with tunable parameters. The parameters used in these quantum channels can be tuned based on a training set of qudits. A quantum channel can refer to a generic quantum operation, which can be a reversible or irreversible quantum operation, in contrast to quantum gates and unitaries which must be reversible. The inputs and outputs of quantum channels can be classical or quantum mixtures of quantum states. After training, QCNN can be applied with these tuned parameters on a new set of qudits to find a solution based on the trained QCNN circuit.

In some embodiments, QCNN can solve intrinsically quantum many-body problems. One exemplary problem solvable using embodiments of the disclosed QCNN technique is quantum phase recognition ("QPR"). QPR problems ask whether a given input quantum state $\rho_{in}$ belongs to a particular quantum phase of matter. In contrast to many existing solution techniques, such as those based on tensor network descriptions, the QCNN technique is applicable to QPR problems even where $\rho_{in}$ is prepared in a physical system without direct knowledge as to its classical description. Another exemplary problem solvable using embodiments of the disclosed QCNN technique is quantum error correction ("QEC") optimization. Such problems seek to identify an optimal QEC code for a given, a priori unknown error model such as, but not limited to dephasing or potentially correlated depolarization in realistic physical systems. Aspects of the present disclosure describe non-limiting theoretical frameworks and numerical demonstrations for the successful application of QCNN techniques to exemplary non-limiting problems.

Classical convolutional neural network ("CNN") provides a machine learning architecture for classification tasks such as image recognition. A CNN can consist of a sequence of different (interleaved) layers of image processing; in each layer, an intermediate two-dimensional array of pixels, which can be referred to as a feature map, is produced from the previous one. As discussed above, CNN layers connect 'volumes' of multiple feature maps to subsequent volumes.

Without being bound by theory, the case of a single feature map per volume is discussed below. The convolution layers compute new pixel values $x_{i,j}^{(\ell)}$ from a linear combination of nearby ones in the preceding map, where the new pixel values can be expressed as:

$$x_{i,j}^{(\ell)} = \sum_{a,b=1}^{w} w_{a,b} x_{i+a,j+b}^{(\ell-1)}, \qquad \text{Equation 1}$$

where $\ell$ is the layer, and j denote the position of the pixel, the weights $w_{a,b}$ form a w×w matrix, and a, b denote indices into the weight matrix. Pooling layers reduce the feature map size, for example by taking the maximum value from a few contiguous pixels, and can be followed by the application of a nonlinear (activation) function, which can capture and amplify nonlinear correlations of the input. Activation functions introduce nonlinearity into classical and quantum neural networks, and the nonlinearity can increase the performance of the neural networks. Once the feature map size becomes sufficiently small, the final output is computed from a function that depends on all remaining pixels, which can be referred to as the fully connected layer. The weights and fully connected function can be optimized by training on large datasets, where the characteristic to be distinguished is known. In contrast, variables such as the number of convolution and pooling layers and the size w of the weight matrices (which can be referred to as hyperparameters) can be fixed for a specific CNN. In some embodiments, multiple combinations of hyperparameters are tested to determine which set of hyperparameters is most effective and/or efficient. However, a person of skill in the art would understand based on the present disclosure that such testing would add additional training time to determine the set of effective hyperparameters. One key property of a CNN can be the translational invariance of convolution and pooling layers, which allows each of these layers to be characterized by a constant number of parameters (which can be independent of system size) and sequential data size reduction (e.g., a hierarchical structure).

FIG. 1A is a simplified diagram of a classical CNN technique. As shown in FIG. 1A, the classical CNN begins with an input image 110, which in this case is a cat. A sequence of image-processing layers 120 and 130, and 122 and 132 transforms an input image into a series of feature maps (white rectangles) and finally into an output probability distribution 150.

More specifically, a convolution layer can involve at least one convolution step 120 on the input image followed by a pooling step 130. Convolution 120 takes subsets of pixels in the input image 110 for the first convolution step, or in the previous feature map for subsequent convolution steps, and combines them using a mathematical operation. The convolution step 120 can be performed on multiple subsets of pixels such that the entire image (or feature map) is covered. Multiple convolutions across the entire image (or feature map) can be performed in the convolution step 120. Each of these convolutions can vary based on what basic function is applied, what pixels are convolved, what parameters are used during convolving, and the like. After the one or more convolution steps 120, the pixels are pooled in step 130 using a pooling function. A pooling function can take as an input the state of two or more pixels and output a smaller number of pixels with a state or characteristic that is dependent on the input pixels. In this way, the size of the image or feature map can be reduced by any fraction. These convolving and pooling steps can be repeated in other layers (e.g., convolution(s) 122 and pooling(s) 132) to obtain a final feature map 140. Subsequently, a fully connected layer, such as a function that combines the state of all remaining pixels, can be performed on the final feature map 140 in order to obtain an output probability distribution 150. The output probability distribution 150 can be indicative of some property of the input image 110, such as whether the input image 110 contains a cat or a dog, with high probability.

By convolving and pooling the pixels in the input image 110, it is possible to reorganize and reduce the information contained in the input image 110 in a way that ultimately produces an output that classifies the input image 110 (e.g., determines some characteristic about the input image 110). As discussed above, the parameters used throughout the CNN can be trained to better distinguish this characteristic of the image. Each convolution step 120 and 122, and each pooling step 130 and 132 can be varied, for example by tuning the weights $w_{a,b}$ in equation (1). In some examples, training a CNN involves determining parameters for each convolution step and pooling step such that application of the CNN produces a reliable output probability distribution 150. For example, multiple input images with cats and dogs can be used as training data, and the parameters of the CNN can be varied and applied to these images to identify a parameter set that is able to distinguish between images with cats and images with dogs.

FIG. 1B is a diagram showing an example QCNN circuit, according to some embodiments. In some embodiments, the circuit's input is a classical or quantum state $\rho_{in}$ 111, which can include a plurality of qudits. While most examples and descriptions considered herein will use qubits, a person of skill in the art would understand from the present disclosure that the technique in general applies to qudits with Hilbert space of arbitrary fixed dimension d. During training, the output classification or probability distribution corresponding to the input quantum state $\rho_{in}$ 111 may be known so as to tune the QCNN parameters. When applying a trained QCNN, the output probability distribution of the quantum state $\rho_{in}$ 111 may be unknown. Like the CNN, the QCNN proceeds with one or more convolving layers 121, 123, 125, 127, which may also be referred to as convolution layers, interleaved with one or more pooling layers 131, 135. The circuit concludes with a fully connected layer 142 followed by measurement of the resulting quantum state 162. Although the example QCNN circuit shown in FIG. 1B includes two convolution layers 121, 123 and 125, 127 between each pooling layer 131, 135, and only two sets of convolution and pooling layers 121, 123, 131 and 125, 127, 135 (e.g., a QCNN depth of two), a person of skill in the art would understand from the present disclosure that these numbers are merely examples, and the numbers of convolution and pooling layers can be varied depending on each implementation. Depending on the particular choice of hardware on which to implement the QCNN technique and the problem to be solved, the gate depth of each layer may vary, where, in this context, the gate depth can refer to the maximal number of gates applied to any fixed, given qubit. In some embodiments, simpler problems with fewer numbers of input qubits may implement fewer numbers of convolution and pooling layers and smaller gate depths within each layer, while more complicated problems may involve larger numbers of layers with larger gate depths within each layer.

In light of the freedom in choosing the gate depth within each layer and the number of layers in a QCNN circuit, various restrictions can be imposed on a QCNN circuit to increase efficiency and performance, according to some embodiments. For example, when the QCNN technique is applied to solving a problem instance in a class of problems whose inputs comprise a larger and larger number N of qubits, but whose statements are otherwise the same, the total number of convolution and pooling layers applied should not grow asymptotically faster than the logarithm of N multiplied by a constant independent of N. In this context, a constant can be considered independent of the number N of input qubits if the constant does not increase when N is increased. Furthermore, the maximal gate depth within any layer should not increase beyond a fixed constant independent of N. Moreover, when convolving subgroups and pooling subgroups are chosen within each convolving or pooling layer, respectively, the maximal size of any such subgroup in the entire QCNN circuit should not be larger than a fixed constant independent of N. In addition, if two qubits x, y within a plurality P of qubits are required to be proximal to one another, the ratio of the distance between the two qubits x and y to the minimum distance between any two qubits in P (which have not yet been measured or disregarded in a preceding pooling layer, as described below) should not be larger than a constant independent of N. If all qubits acted on by a single unitary operation U are proximal to one another, the operation U may be called quasilocal.

One example subclass of QCNN convolving or pooling layers comprises convolving or pooling layers for which the input qubits to the layers are arranged to cover the points of a (finite) lattice. In this context, a lattice can refer to a set of points such that for some lattice direction δ and lattice distance Δ, for any point x in the lattice (except possibly a small number of points which are said to belong to the boundary of the lattice), there is another point y in the lattice located a distance Δ away from x in the direction δ. Furthermore, as the number of points M in the lattice is increased, the ratio of the number of points in the boundary of the lattice to M should approach zero. When the input qubits to a QCNN layer are arranged to cover the points of a lattice λ, the QCNN layer can be said to be translationally invariant if for some lattice direction δ and lattice distance Δ of λ, for any input qubit x (except possibly a small number of input qubits in the boundary of the lattice), the operations applied to x are precisely the same as the operations applied to the qubit located at a distance Δ away from x in the direction δ. Furthermore, as the number of qubits M in the lattice is increased, the ratio of the distance Δ to the minimum distance between any two points in the lattice should be a constant independent of M.

In some embodiments, each convolution layer 121, 123, 125, 127 applies a single quasilocal unitary ($U_i$) in a translationally invariant manner for finite depth independent of the number N of input qudits to convolving subgroups of the qubits. For example, as shown in FIG. 1B, each quasilocal unitary $U_i$ is applied to subsets of two qubits. In a non-limiting example physical implementation with qubits implemented as neutral atoms coupled to Rydberg states, a quasilocal unitary could comprise of, for example, a sequence of laser pulses which entangles two nearby atoms.

In some embodiments, pooling layers 131, 135 measure a fraction of qubits. In some embodiments, the pooling layers 131, 135 are translationally invariant as discussed above. A pooling layer can comprise dividing the qubits into pooling subgroups. The size of each pooling subgroup should be independent of the total number of input qubits, and the qubits in each pooling subgroup should be in proximity to each other. Within each pooling subgroup, a subset of qubits can be measured. The outcome of these measurements can be used to determine the unitary rotations ($V_j$) applied to nearby qubits. Thus, without being bound by theory, non-linearities in QCNNs can arise from reducing the number of degrees of freedom (e.g., the number of qubits in each subsequent layer). Convolution and pooling layers can be interleaved (repeated) until the system size is sufficiently small (e.g., when there are a small enough number of qubits). These repeated convolution and pooling layers can be applied to pluralities of input qubits which have not yet taken part in any pooling layer measurement. In some embodiments, in this repeating of convolution and pooling layers, one or more of the convolving subgroups or one or more of the unitaries in any of the subsequent convolution layers 125, 127 can be different from those in the initial convolution layer 121, 123. Similarly, in some embodiments, in this repeating of convolution and pooling layers, one or more of the pooling subgroups or one or more of the unitaries in any of the subsequent pooling layers 135 can be different from those in the initial pooling layer 131. In some embodiments, in one or more of the convolution layers, the unitaries applied to convolving subgroups of qubits can be the identity map. In some embodiments, in any pooling layer other than the first pooling layer, the fraction of measured qubits can be zero, and the resulting unitary rotations of qubits can be identity maps. Subsequently, a fully connected layer 142 is applied as a unitary F on the remaining qubits. In some embodiments, the unitary F can be a multi-qubit unitary gate such as a Toffoli gate that is applied simultaneously on more than two qubits. In another example, the unitary F can be the identity map. Finally, the outcome of the circuit is obtained by measuring a fixed number of output qubits in the step 162. In some embodiments, QCNN hyperparameters such as the number of convolution and pooling layers can be fixed, and the unitaries themselves can be learned based on training sets.

While all example QCNNs presented thus far in the present disclosure apply unitary quantum gates in the convolution, pooling, and fully connected layers, a person of skill in the art would understand from the present disclosure that the technique can be extended to cases where such operations are quantum channels which describe maps from generic mixed classical or quantum states to other mixed states. Similarly, while the present disclosure describes embodiments where convolution layers are applied before pooling layers, the application of pooling layers before the first set of convolution layers is also contemplated. Furthermore, in some embodiments of the present disclosure, the measurement operations collapse the wavefunctions of groups of qubits onto individual basis vectors of the Hilbert space of the groups of qubits, with the probability for each basis vector determined by the state of the qubits before measurement. As a non-limiting example, in some physical implementations, each basis vector can be a product state of single-qubit states in a computational basis of the qubits (e.g., the simultaneous eigenstates of all single-qubit Pauli-Z operators). However, a person in the skill of art would understand from the present disclosure that the QCNN technique can be generalized to cases where measurements are replaced with projection operations which project the states of groups of qubits into one of a complete, orthogonal set of subspaces (of dimension possibly higher than 1) of the Hilbert space of the groups of qubits. The outcome of such a projection of the state of one or more qubits can comprise the subspace into which the state is projected. As one non-limiting example, in a physical implementation where a qudit is encoded in the d hyperfine ground state levels of a neutral atom, one such projection operation could comprise coupling one of the d levels to a cycling transition and detecting fluorescence. In this non-limiting example, the complete, orthogonal set of subspaces would contain one subspace of dimension 1, spanned by the single level coupled to the cycling transition, and one subspace of dimension d−1, spanned by the remaining levels. More broadly, the projections can be replaced by generalized measurements or Positive Operator-Valued Measures, in which the subspaces are not orthogonal, and the outcome of a generalized measurement of the state of one or more qubits can comprise the subspace into which the state is projected. The extensions listed above can also be made for QCNNs discussed in the remainder of this present disclosure.

Figure 6:
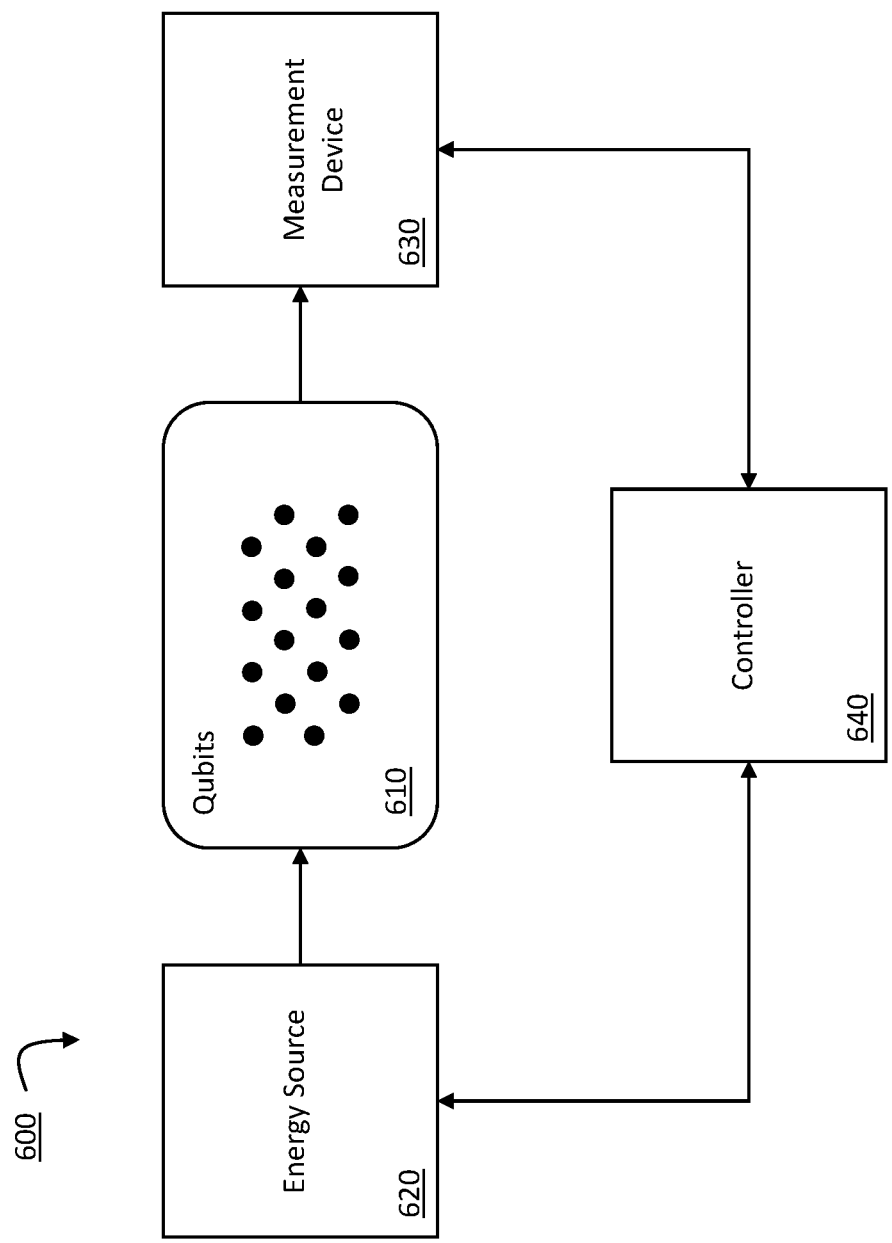
FIG. 6 is a diagram showing a quantum convolutional neural network circuit system, according to some embodiments.

FIG. 6 is a diagram showing a QCNN circuit system, according to some embodiments. As shown in FIG. 6, the QCNN circuit system 600 includes a plurality of qubits 610 that may be in a known or unknown state. Energy source 620 applies energy, such as but not limited to laser light or microwave radiation at a selected wavelength, or magnetic fields of a selected strength and direction, to the qubits 610 to implement embodiments of the QCNN method described throughout the present disclosure. Energy source 620 can be configured to selectively apply energy to individual or subsets of the qubits 610. Energy source 620 can comprise multiple energy sources such that energy can be applied of different types, amounts, wavelengths, frequencies, phases, or the like to the qubits 610. The energy source 620 can include one or more of a laser or microwave generator, magnetic field generator, or the like.

The system 600 can also include a measurement device 630 configured to measure the state of one or more of the qubits 610, according to some embodiments. The measurement device 630 can include, for example, a photodetector, microwave resonator, cavity resonator, or the like. In some embodiments, the measurement device 630 can be configured to perform spatially resolved measurements of individual or subsets of qubits. The measurement device 630 can include multiple measurement devices, for example, to perform different types of measurements on the qubits 610.

In some embodiments, the energy source 620 and/or the measurement device 630 can be operatively coupled to a controller 640. The controller 640 can be configured to control one or more of the energies applied by the energy source 620 and the measurement device 630. For example, the controller 640 can be configured to control one or more of: the initialization procedure for the qubits 610; the type, amount, wavelength, frequency, phase, duration, or the like of the energy applied to the qubits 610 by energy source 620; to which of the qubits 610 the energy source 620 applies energy; the type and timing of the measurement by measurement device 630; which of qubits 610 are to be measured by the measurement device 630; neural network training procedures; or the like. The controller 640 can be configured to adjust the energy applied by energy source 620 based on measurements of qubits 610 by the measurement device 630.

In some embodiments, the controller 640 can include or be connected to a user interface, such as a graphical user interface, which can allow a user of the system 600 to provide input. Input can include, for example, information relating to: an initialization scheme for the qubits 610; the type, amount, wavelength, frequency, phase, duration, or the like of the energy applied to the qubits 610 by energy source 620; to which of the qubits 610 the energy source 620 applies energy; the type and timing of the measurement by measurement device 630; which of qubits 610 are to be measured by the measurement device 630; the depth of a quantum circuit to be applied; parameters or hyperparameters of a quantum circuit to be applied; neural network training procedures; or the like. In addition to or as an alternative to the user interface, the controller 640 can include or be connected to a communications device for receiving input using a wireless, wired, Bluetooth, or other type of communication system. The controller 640 can also include an input port, such as a USB port or the like, for receiving input.

In some embodiments, the controller 640 may be a computer, such as a personal computer, a server, or any other type of computing system. The controller 640 may comprise multiple computers connected using various connection technologies, such as, but not limited to wireless, wired, or Bluetooth connections. The controller 640 can include a memory for storing instructions for tasks including but not limited to qubit initialization procedures or performing QCNN circuits, and/or for storing the results from the measurement device. The controller 640 can include a processor configured to implement instructions for tasks including but not limited to initializing the qubits 610, performing a QCNN circuit and/or to process information received from one or more of the energy sources 620 and/or the measurement device 630.

Without being bound by theory, a QCNN to classify N-qubit input states can be characterized by O(log(N)) parameters. This can correspond to a double exponential reduction compared with a generic quantum circuit-based classifier and can allow for efficient learning and implementation. In some embodiments, generic quantum circuit-based classifiers could apply an arbitrary N-qubit unitary gate to the input state of N qubits before measuring the output qubit(s) and can thus be characterized by a number of parameters which grows exponentially with N. For example, given a set of M classified training vectors $\{(|\psi_\alpha\rangle, \gamma_\alpha): \alpha=1, \ldots, M\}$, where $|\psi_\alpha\rangle$ are input states and $\gamma_\alpha=-1$ or 1 are corresponding binary classification outputs, the mean squared error can be computed as $$MSE = \frac{1}{2M} \sum_{\alpha=1}^{M} (\gamma_\alpha - f_{\{U_i, V_j, F\}}(|\psi_\alpha\rangle))^2 \qquad \text{Equation 2}$$

where $f_{\{U_i, V_j, F\}}(|\psi_\alpha\rangle)$ denotes the expected QCNN output value for input $|\psi_\alpha\rangle$. In some embodiments, learning consists of initializing all unitaries and successively optimizing them until convergence, for example via gradient descent. In embodiments of such gradient descent methods, the derivative of a cost function with respect to parameters of the neural network can be estimated. This information can be used to update the parameters so as to optimize the cost function. Convergence can be achieved in such methods when the cost function no longer changes upon updating parameters with a set tolerance threshold. In some embodiments, other optimization techniques or parameter search methods can be used to update the parameters, such as, but not limited to, the Dividing Rectangles method, genetic algorithms, or Nelder-Mead methods.

Without being bound by theory, the QCNN circuit described above can be related to two concepts in quantum information theory—the multiscale entanglement renormalization ansatz ("MERA") and QEC. QEC can refer to a mechanism to detect and correct local quantum errors without collapsing the wavefunction. The MERA framework provides an efficient tensor network representation of many classes of many-body wavefunctions. The structural relationships between QCNN and MERA then suggest the applicability of the QCNN technique to problems where the wavefunctions of input quantum states can be described using MERA tensor networks, which can represent a broad class of quantum states.

Without being bound by theory, a MERA can be understood as a scheme to generate a quantum state by applying a sequence of unitary and isometry layers to an input state (for example |00⟩), and the resulting state can be said to be represented by such a MERA scheme. While both types of layers in MERA apply quasilocal unitary gates, each isometry layer first introduces a set of new qubits in a predetermined state, such as |0⟩. This exponentially growing, hierarchical structure allows for the long-range correlations associated with critical systems. In some aspects, the QCNN circuit operates similarly in the reverse direction. In some embodiments, for any given state |ψ⟩ with a MERA representation, a QCNN can be designed to recognize |ψ⟩ with deterministic outcomes at each measurement operation. For example, for each measurement performed during QCNN, the same outcome (e.g. |0>) occurs for each run of the experiment. One such QCNN comprises the inverse of the MERA circuit for |ψ⟩.

Figure 1C:
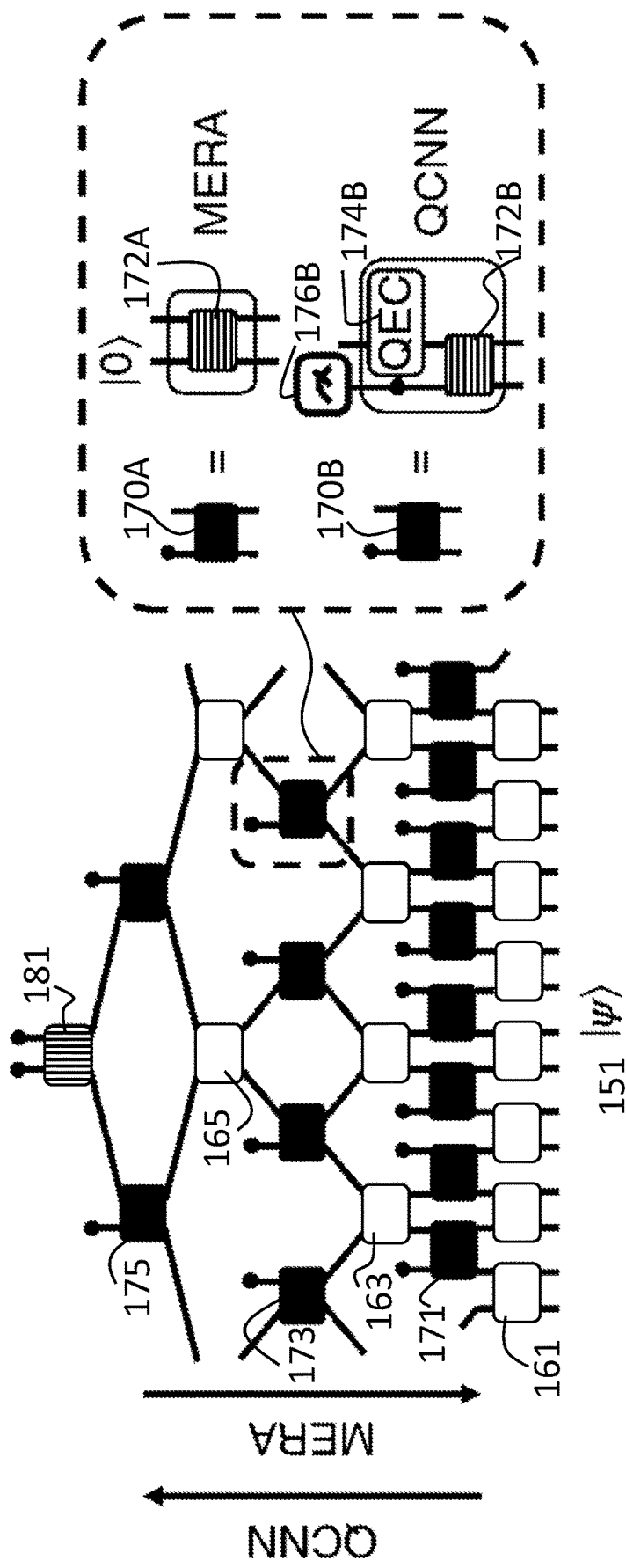
FIG. 1C is a diagram showing a representation of a quantum convolutional neural network circuit, according to some embodiments.

In some embodiments, for input states other than |ψ⟩, such a QCNN may not generally produce deterministic measurement outcomes, which means that there is more than one possibility for the measurement outcomes, and each possible outcome has a probability prescribed by the quantum state before the measurement. These additional degrees of freedom can distinguish a QCNN from a MERA. For example, the measurements can be identified as syndrome measurements in QEC. Such syndrome qubit measurements can help detect and correct errors on the quantum states. In many traditional QEC settings, syndrome measurements resulting in all |0⟩ states denote that no error has occurred on the input state, whereas syndrome measurements resulting in the |1⟩ state would signify error. The particular locations of the |1⟩ states can determine the precise error that occurred or the error correction unitaries $V_j$ to apply to the remaining qubit(s). Thus, without being bound by theory, in some embodiments a QCNN circuit with multiple pooling layers can be analogized to a combination of a MERA (a variational ansatz for many-body wavefunctions) and nested QEC. For example, without being bound by theory, FIG. 1C is a diagram showing the structural similarity of some QCNN circuits with MERA circuits. As shown in FIG. 1C, both circuits contain interleaved convolution layers 161, 163, 165 and pooling layers 171, 173, 175. In some embodiments, a QCNN circuit begins with an input set of qubits 151 in state |ψ⟩, and interleaves convolution layers 161, 163, 165 (white boxes) with pooling layers 171, 173, 175 (black boxes), before applying a fully connected layer 181 (vertical striped box) to arrive at a final quantum state. As shown in exemplary pooling step 170B for QCNN, in some embodiments, a quasilocal unitary 172B (horizontally striped box) is applied to two input qubits. One of the input qubits is then measured in step 176B, while a QEC unitary rotation 174B is applied to the other input qubit. By contrast, the analogous MERA circuit would operate in the reverse direction as QCNN, beginning with a quantum state, applying the inverse unitary of the fully connected layer 181, and interleaving isometry (i.e. inverse-pooling) steps 171, 173, 175 with inverse-convolution steps 161, 163, 165. As shown in exemplary inverse-pooling step 170A for MERA, an input qubit is combined with another qubit in state |0⟩. The unitary operation 172A, which is the inverse of the quasilocal unitary 172B, is applied to this combination of two qubits to produce the resultant two-qubit output. A pooling layer for QCNN can thus differ substantially from the corresponding inverse-pooling layer, due to the presence of the QEC unitary rotation 174B.

Figure 7A:
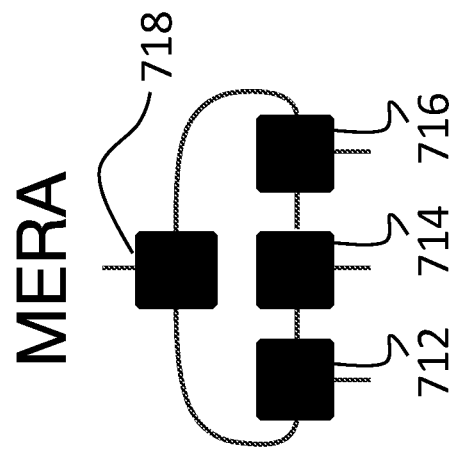
FIGS. 7A-7B are diagrams showing example steps to construct a QCNN for detecting phase transitions, in some embodiments.
Figure 7A:
Figure 7A:
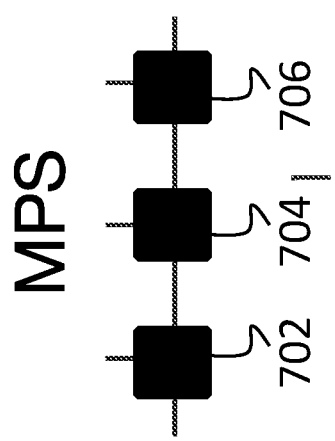
Figure 7B:
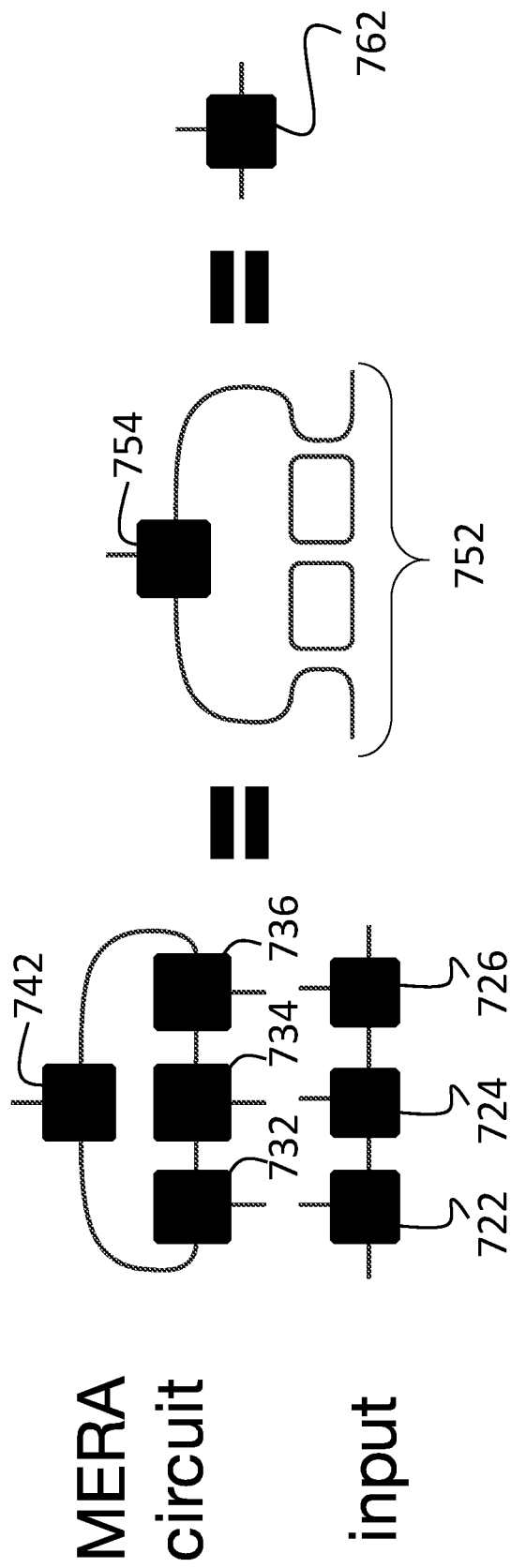
Figure 7C:
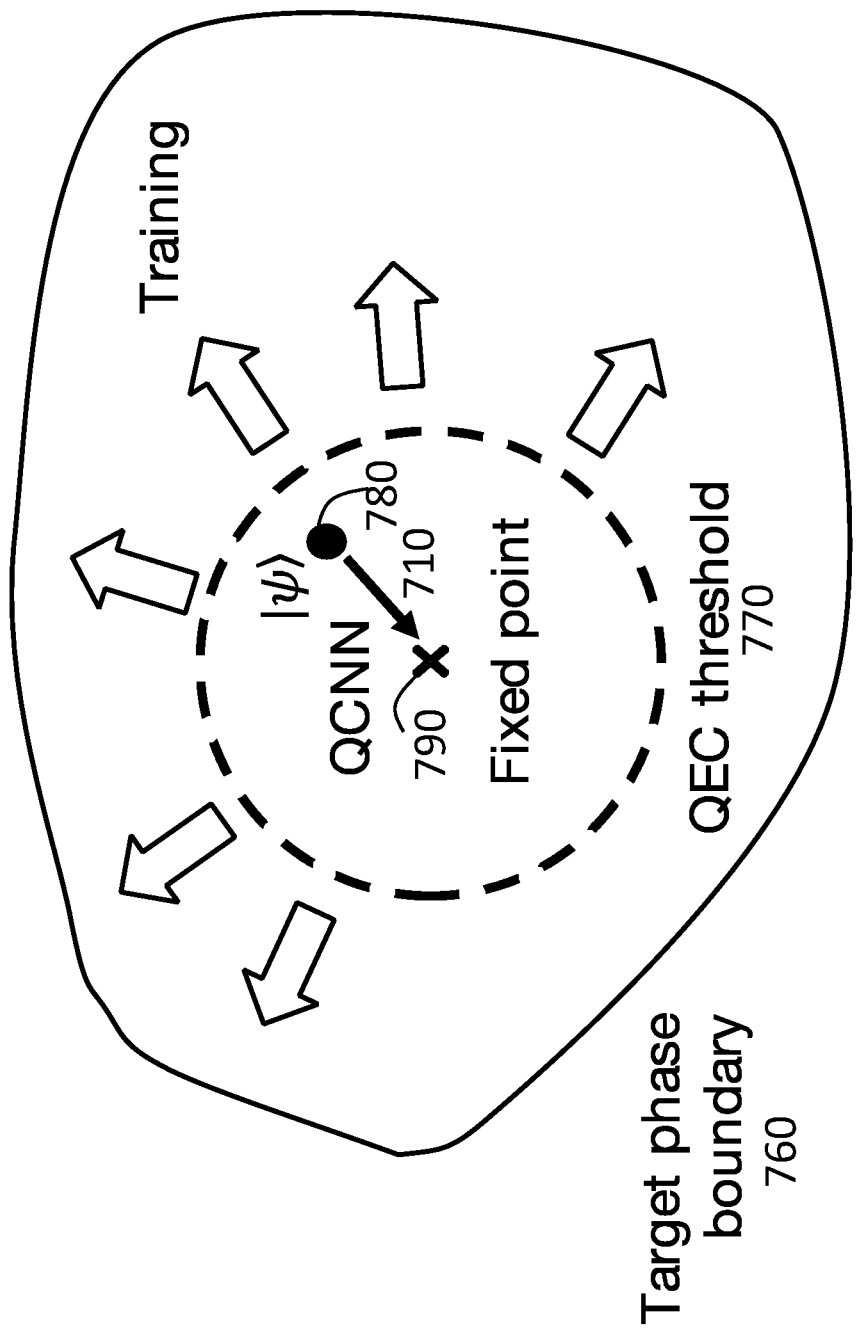
FIG. 7C is a schematic diagram illustrating the method by which a QCNN detects phase transitions, according to some embodiments.

Without being bound by theory, an interpretation of QCNNs in terms of MERA and QEC can be applied to recognizing more generic quantum phases. In some embodiments, for any quantum phase $\mathcal{P}$ whose renormalization-group fixed-point wavefunction $|\psi_0(\mathcal{P})\rangle$ has a tensor network representation in isometric or G-isometric form shown in FIG. 7A, a corresponding QCNN circuit can be systematically constructed. This family of quantum phases includes all 1D SPT and 2D string-net phases. In these cases, a commuting parent Hamiltonian H can be explicitly constructed which has $|\psi_0(\mathcal{P})\rangle$ as a ground state. This gives rise to a MERA structure in which $|\psi_0(\mathcal{P})\rangle$ is a fixed-point wavefunction. More specifically, in some embodiments, a matrix product state (MPS) representation of $|\psi_0(\mathcal{P})\rangle$ in isometric or G-isometric form can be constructed from H, and this representation can be characterized by matrices at each qubit or qudit site (black boxes in 702, 704, 706 in FIG. 7A). For 1D SPT and 2D string-net phases, these all can correspond to the same matrix. A MERA representation of the state can then be constructed from this matrix, for example by placing it at locations 712, 714, 716, 718 as shown in FIG. 7A. Such a MERA has $|\psi_0(\mathcal{P})\rangle$ as a fixed-point wavefunction: after each isometry layer, the intermediate state is in the state $|\psi_0(\mathcal{P})\rangle$ with a different number of qubits, and the number of qubits in that state grows with each isometry layer applied. FIG. 7B is an example diagrammatic proof of this fixed-point property. In addition, any 'local error' perturbing an input state away from $|\psi_0(\mathcal{P})\rangle$ can be identified by measuring a fraction of terms in the parent Hamiltonian, similar to syndrome measurements in stabilizer-based QEC. Then, a QCNN for $\mathcal{P}$ can comprise the MERA for $|\psi_0(\mathcal{P})\rangle$ and a nested QEC scheme in which an input state with error density below the QEC threshold 'flows' to the RG fixed point. Such a QCNN can be optimized via embodiments of the disclosed learning procedure. A schematic diagram illustrating this 'flow' under the QCNN's nested QEC protocol is shown in FIG. 7C, where the fixed-point state is labeled by an 'x' 790, the generic input state is labeled by a dot 780, and the action of the QCNN is labeled by a black arrow 710.

While embodiments of the disclosed learning protocol can begin with completely random unitaries, as in the classical case, such an initialization may not be the most efficient for gradient descent. In some embodiments, an initial parameterization can comprise a MERA representation of $|\psi_0(\mathcal{P})\rangle$ and one choice of nested QEC. This is illustrated in an example in FIG. 7C where $|\psi_0(\mathcal{P})\rangle$ is denoted by an 'x' 790, the nested QEC action of QCNN is depicted as a black arrow 710, and the threshold of this nested QEC scheme is depicted as a dotted black circle 770. With such an initialization, the learning procedure (white-filled arrows) serves to optimize the QEC scheme, expanding its threshold 770 to the target phase boundary 760.

In some embodiments, QCNNs can be used as an architecture for classifying input quantum states. In some of these embodiments, QCNN is performed on an input set of qubits in an unknown quantum state, with the goal of determining a property or pattern of this quantum state such as a quantum phase of matter to which the state belongs. QCNN then proceeds as discussed above and measures a fraction of the final number of qubits after the last fully connected layer. The result of this measurement is indicative of the quantum phase of matter. Such processes can also be referred to as quantum phase recognition ("QPR"), which seeks to identify a quantum phase of matter from an initial many-body quantum state.

In some embodiments, for QPR, QCNN can provide a MERA realization of a representative state $|\psi_0\rangle$ in a target phase of matter. A target phase may refer to a quantum phase of matter that the QCNN circuit seeks to identify for a QPR problem, such as the phase $\mathcal{P}$ in the QPR problem "Does $|\psi\rangle$ belong to $\mathcal{P}$?". Without being bound by theory, other input states within the same phase can be viewed as $|\psi_0\rangle$ with local errors, which are repeatedly corrected by the QCNN circuit in multiple layers. In other words, though the initial state may differ slightly from another state $|\psi_0\rangle$ in the target phase, QCNN can correct these differences like errors in QEC to ultimately produce an output that is the same or similar to the output that would be achieved by applying QCNN to the state $|\psi_0\rangle$. Without being bound by theory, the QCNN circuit can therefore mimic renormalization-group flow, a methodology that classifies many families of quantum phases.

For example, QCNN can be implemented for QPR in an example class of 1D many-body systems. One example includes a $\mathbb{Z}_2 \times \mathbb{Z}_2$ symmetry-protected topological ("SPT") phase of matter $\mathcal{P}$. Without being bound by theory, unlike traditional phases of matter such as solid, liquid, or gas, which are characterized by the set of symmetries of a physical system in that phase, SPT phases can be characterized by how a physical system transforms under a given, fixed set of symmetry operations. Thus, while traditional phases of matter can be identified by performing efficient measurements of local observables, the identification of whether a state belongs to an SPT phase can involve measurement of a nonlocal string order parameter ("SOP"), which is an operator involving a large, extensive number of qubits proportional to the number of input qubits. Such nonlocal SOPs can be very expensive to measure as described in more detail below. In contrast, the QCNN technique can be employed to substantially reduce the overhead of identifying such phases of matter for QPR problems. In one example, the input states to the exemplary QCNN considered will be the ground states $\{|\psi_G\rangle\}$ of a family of Hamiltonians on a spin-½ chain with open boundary conditions:

$$H = -J \sum_{i=1}^{N-2} Z_i X_{i+1} Z_{i+2} - h_1 \sum_{i=1}^{N} X_i - h_2 \sum_{i=1}^{N-1} X_i X_{i+1} \quad \text{Equation 3}$$

where $X_i$, $Z_i$ are Pauli operators for the spin at site i, and $h_1$, $h_2$ and J are parameters of the Hamiltonian. The $\mathbb{Z}_2 \times \mathbb{Z}_2$ symmetry can be generated by $$X_{even(odd)} = \prod_{i \in even(odd)} X_i. \quad \text{Equation 4}$$

Without being bound by theory, when $h_2=0$, the Hamiltonian is exactly solvable via the Jordan-Wigner transformation. This confirms that $\mathcal{P}$ is characterized by non-local order parameters. When $h_1=h_2=0$, all terms are mutually commuting, and a ground state is the 1D cluster state. The goal of applying QCNN can be to determine whether a given, unknown ground state drawn from the phase diagram belongs to $\mathcal{P}$.

Figure 2A:
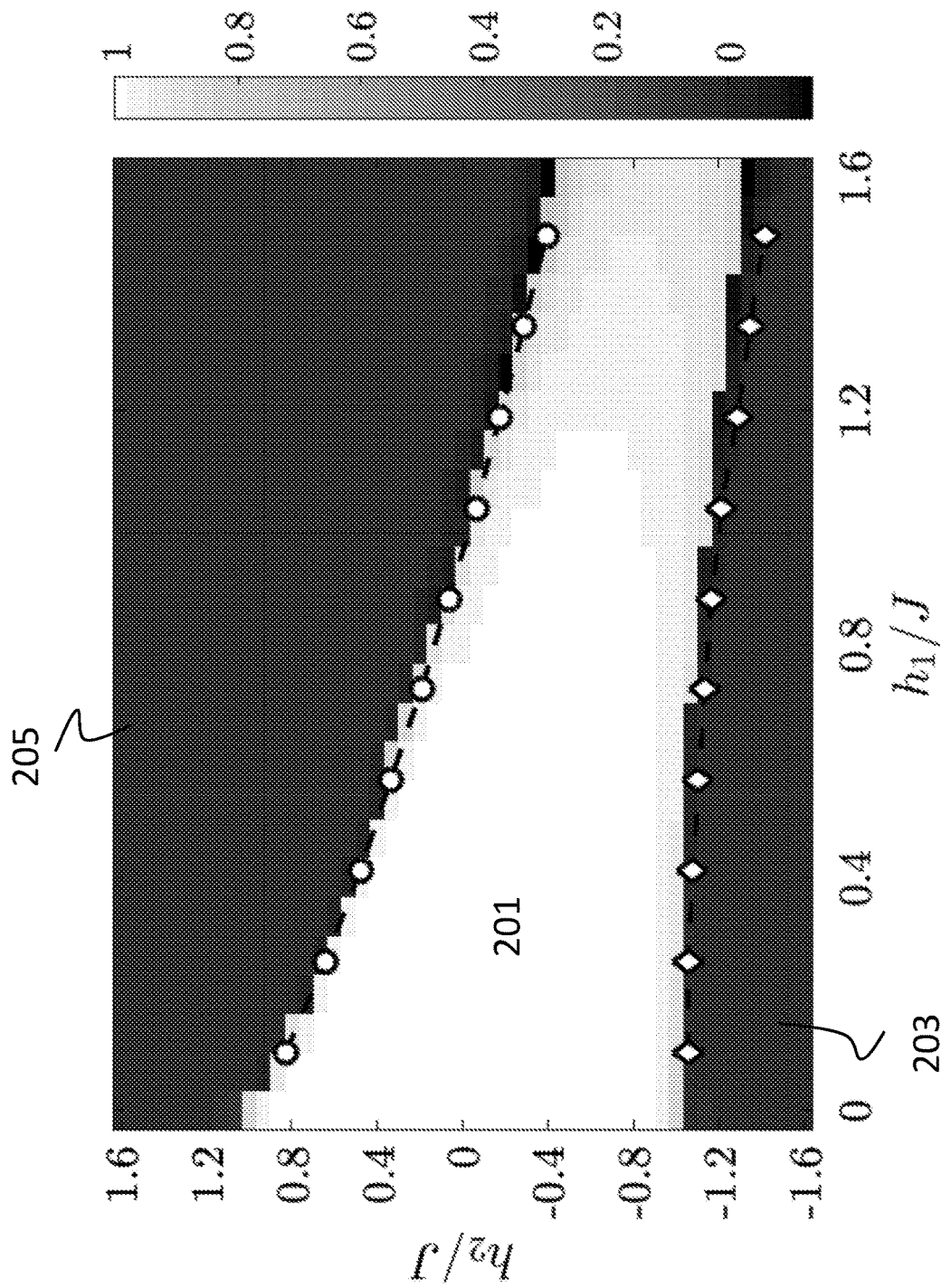
FIG. 2A is a graph showing a phase diagram and the performance of an example quantum convolutional neural network, according to some embodiments.

FIG. 2A shows the phase diagram as a function of the parameters ($h_1/J$, $h_2/J$). The input state of the exemplary QCNN circuit is the ground state of the Hamiltonian in Equation 3, with the parameters ($h_1/J$, $h_2/J$). With different parameters ($h_1/J$, $h_2/J$), this input state can belong to different phases of matter, which the exemplary QCNN circuit can be used to determine. FIG. 2A shows three phases of the system: 201, 203, and 205. Phase 201 corresponds to the target $\mathbb{Z}_2 \times \mathbb{Z}_2$ SPT phase $\mathcal{P}$, phase 203 corresponds to an antiferromagnetic phase where adjacent spins are typically anti-aligned in the X direction, and phase 205 corresponds to a paramagnetic phase where spins are mostly aligned in the X direction. FIG. 2A plots phase boundary points between phases 201 and 203 as diamonds, and between phases 201 and 205 as circles. These exemplary phase boundary points are extracted from infinite-size DMRG numerical simulations, which correspond to exact phase boundary points. The background shading (gray scale) represents a simulated output from an exemplary, exact QCNN circuit for input size N=45 spins. The simulations for this exemplary QCNN circuit are described in more detail below. As shown in FIG. 2A, the exemplary QCNN circuit applied to N=45 spins very closely approximates the exact numerical solutions to the phase boundaries. Thus, this exemplary QCNN, when applied to a set of spins in an unknown phase, can distinguish phase 201 from phases 203 and 205.

The phase diagram shown in FIG. 2A was numerically obtained using the infinite-size density matrix renormalization group (DMRG) algorithm. The technique applies 150 as the maximum bond dimension. To extract each data point in FIG. 2A, the ground state energy density can be numerically obtained as a function of $h_2$ for fixed $h_1$ and its second derivative can be computed. The phase boundary points can be identified from sharp peaks in this second derivative.

Figure 2B:
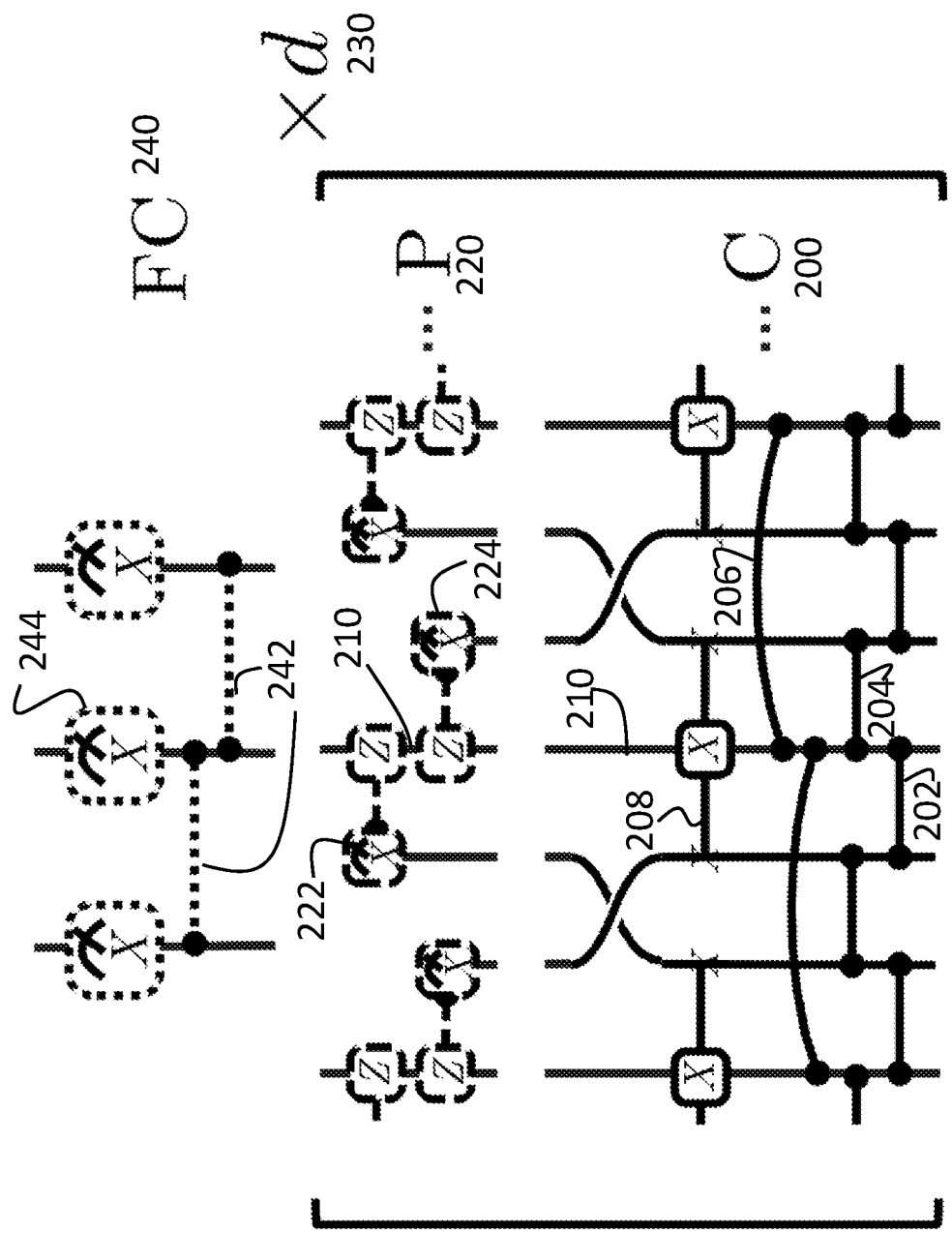
FIG. 2B is a diagram showing an example quantum convolutional neural network circuit, according to some embodiments.

FIG. 2B shows an exemplary QCNN circuit to recognize a $\mathbb{Z}_2 \times \mathbb{Z}_2$ SPT phase $\mathcal{P}$ which was numerically simulated to produce the grayscale shading of FIG. 2A. Embodiments of this exemplary QCNN circuit that recognizes $\mathcal{P}$ can include convolution layers comprising controlled-phase gates as well as Toffoli gates with controls in the X-basis. For example, horizontal lines 202, 204, 206, in the convolution layers 200 represent controlled-phase gates. Without being bound by theory, in a controlled-phase gate, a -1 phase is accumulated in the system's wavefunction if and only if both involved qubits are in the $|1\rangle$ state. For example, such a gate can be implemented in a physical system with qubits encoded in neutral atoms by applying a sequence of Rydberg laser pulses to the two involved qubits. The three-qubit operations 208 represent three-qubit gates equivalent to the Toffoli gate, upon acting on the control (i.e. left and right) qubits by Hadamard gates before and after the three-qubit gate. Without being bound by theory, in a Toffoli gate, the target qubit's state is flipped if and only if both control qubits are in the $|1\rangle$ state.

In some embodiments, pooling layers 220 can perform phase-flips on remaining qubits when one adjacent measurement yields X=-1, and no phase-flip on the remaining qubits when one adjacent measurement yields X=+1. For example, as shown in FIG. 2B, when the qubits adjacent to qubit 210 are measured to be X=−1, qubit 210 is phase-flipped. This sequence of convolution and pooling layers, which can be referred to as a convolution-pooling unit, can be repeated d times 230, where d is the QCNN depth. QCNN concludes with a fully connected layer that measures the expectation value of the three-qubit Pauli operator $Z_{i-1}X_iZ_{i+1}$ on the remaining qubits. The fully connected layer 240 can apply controlled-phase gates 242 followed by an X projection 244 for all remaining, unmeasured qubits, effectively measuring $Z_{i-1}X_iZ_{i+1}$. The result of this measurement is plotted in the grayscale of FIG. 2A for input states characterized by ($h_1$/J, $h_2$/J) shown on the axes with N=45 qubits; for input states containing N=135 qubits characterized by $h_1$/J=0.5 and various values of $h_2$/J along the horizontal axis, this result is plotted in the vertical axis of FIG. 2C.

The simulation of the exemplary QCNN shown in FIG. 2B uses matrix product state representations and update techniques. The input ground state wavefunction can first be obtained using finite-size DMRG with bond dimension D=130 for a system of N=45 or N=135 qubits. The circuit operations can then be performed by sequentially applying swap gates and two-qubit gates on the nearest neighboring qubits. Each three-qubit gate can be decomposed into two-qubit unitaries. In these demonstrations, increasing the bond dimension to D=150 does not lead to any visible changes in in FIG. 2A and FIG. 2C, confirming a convergence of embodiments of the simulation method.

Figure 2C:
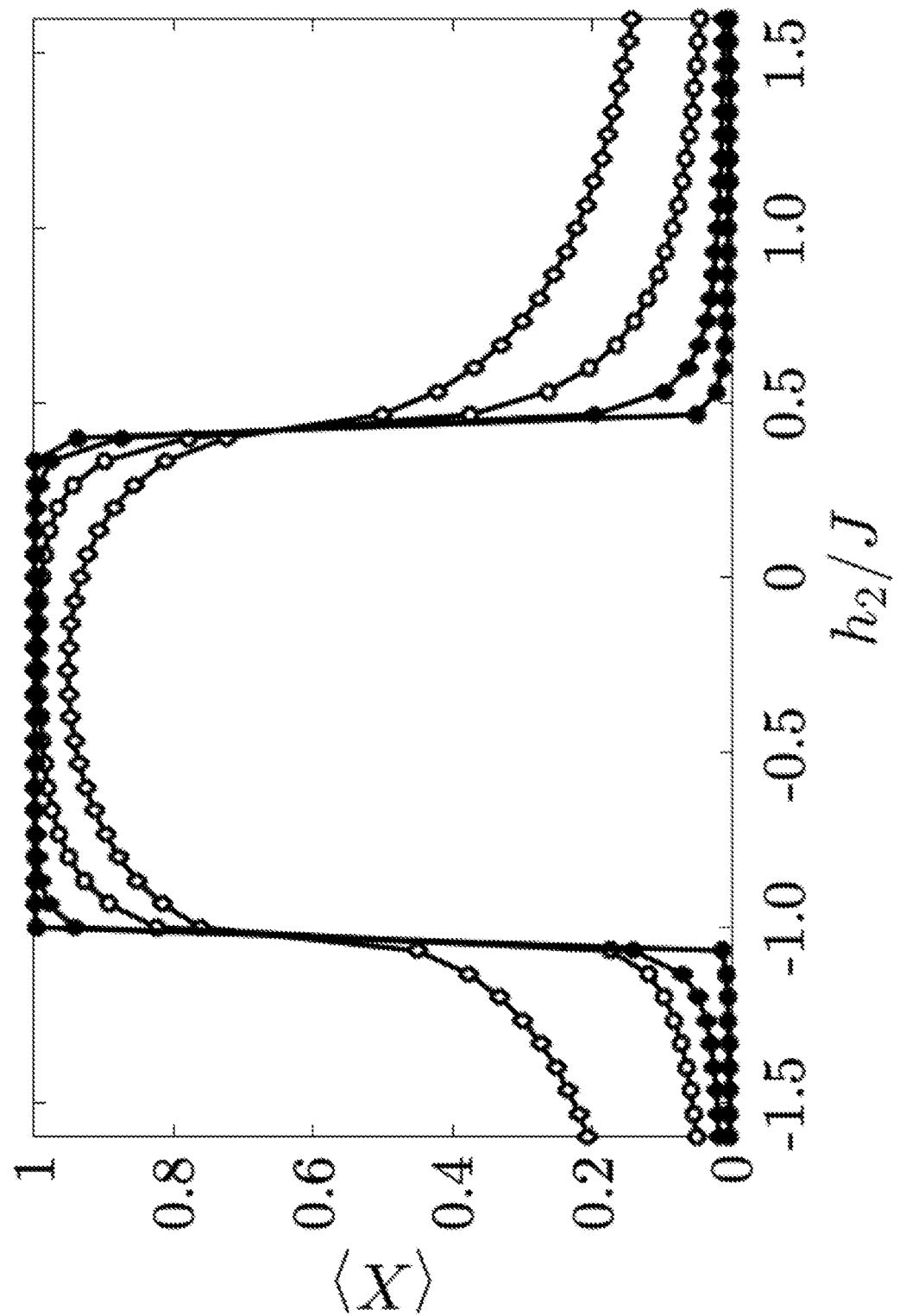
FIGS. 2C-2E are graphs showing the performance of example quantum convolutional neural network circuits, according to some embodiments.

FIG. 2C shows the output of an exemplary QCNN circuit implemented as shown in FIG. 2B for a system of N=135 spins and QCNN depth d=1 (white diamonds), 2 (white circles), 3 (black diamonds), and 4 (black circles) along the line $h_1$=0.5J for various values of $h_2$/J, obtained using matrix product state simulations. As d increases, the measurement outcomes show sharper changes around the phase transition point, which is also called the critical point. Similarly, in FIG. 2A, the grayscale shows the output of an exemplary QCNN circuit shown in FIG. 2B for a system of N=45 spins and d=2. The circuit reproduces the phase diagram with high accuracy. This QCNN can also be used for other Hamiltonian models belonging to the same phase, such as the S=1 Haldane chain, as discussed in more detail below.

In some embodiments, the performance of a QPR solver can be quantified by sample complexity. Sample complexity can refer to the expected number of copies of the input state required, or equivalently, the number of experimental repetitions that need to be performed, to identify its quantum phase. As discussed in more detail below, the sample complexity of embodiments of a QCNN circuit is better than that of conventional methods such as the nonlocal SOPs described above.

Without being bound by theory, in some embodiments $\mathcal{P}$ can be detected by measuring a non-zero expectation value of SOPs S such as $$S_{ab}=Z_aX_{a+1}X_{a+3}\ldots X_{b-3}X_{b-1}Z_b \quad \text{Equation 5:}$$

In particular, a state $|\psi\rangle$ for which $S_{ab}$=+1 with greater than ½ probability belongs to $\mathcal{P}$ whereas a state $|\psi\rangle$ for which $S_{ab}$=+1 with exactly ½ probability does not belong to $\mathcal{P}$.

In some embodiments, the expectation values of SOPs vanish near the phase boundary due to diverging correlation length. In such cases, many measurements of the value of $S_{ab}$ (i.e. many experimental repetitions) will be required to determine with confidence whether the probability of $S_{ab}$=+1 is strictly greater than ½ (e.g. 51%) or exactly ½. In contrast, embodiments of the QCNN can produce much sharper output near the phase transition, and fewer experimental repetitions can be used to determine with confidence that $|\psi\rangle$ belongs to $\mathcal{P}$.

More precisely, without being bound by theory, in some embodiments, given some input state $|\psi_{in}\rangle$ and SOP S, a projective measurement of S can be modelled as a (generalized) Bernoulli random variable, where the outcome is 1 with probability $p=(\langle\omega_{in}|S|\psi_{in}\rangle+1)/2$ and −1 with probability 1−p (since $S^2$ equals the identity operator). After M binary measurements, p can be estimated as $p>p_0$=0.5, which signifies $|\psi_{in}\rangle\in\mathcal{P}$. In such an embodiment, the sample complexity $M_{min}$ can be defined as the minimum M to test whether $p>p_0$ with 95% confidence using an arcsine variance-stabilizing transformation:

$$M_{min} = \frac{1.96^2}{\left(\arcsin\sqrt{p} - \sqrt{\arcsin p_0}\right)^2} \quad \text{Equation 6}$$

Similarly, in some embodiments the sample complexity for a QCNN can be determined by replacing $\langle\psi_{in}|S|\psi_{in}\rangle$ by the QCNN output expectation value in the expression for p.

Figure 2D:
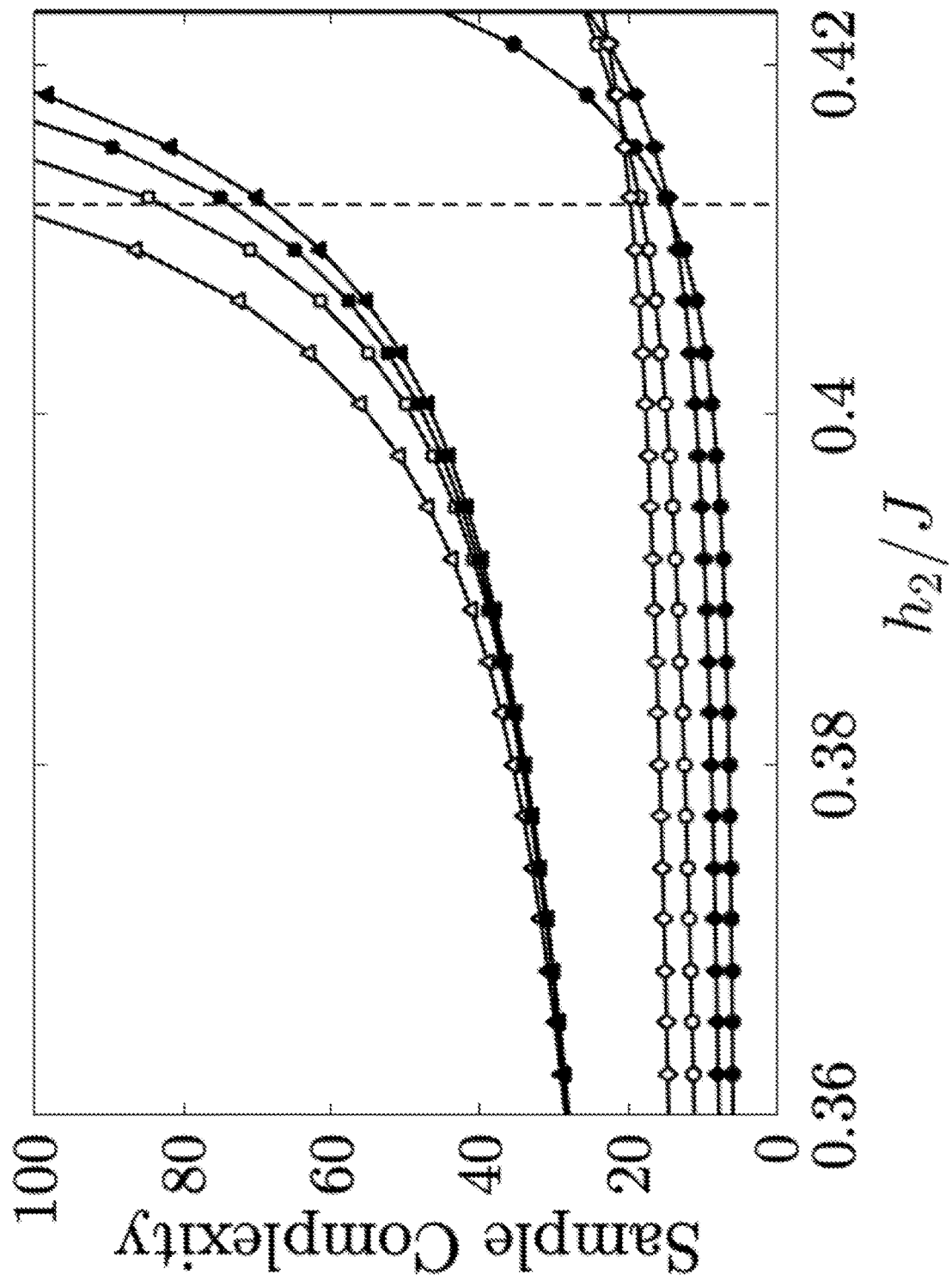

FIG. 2D is a graph showing the sample complexity for the QCNN at various depths and SOPs of different lengths. More specifically, FIG. 2D is a graph showing sample complexity for exemplary QCNNs and SOPs plotted against $h_2$/J for detection of an exemplary phase transition (e.g., SPT to paramagnet) along $h_1$=0.5J for N=135 spins. QCNN sample complexity is shown at depths d=1 (white diamonds), 2 (white circles), 3 (black diamonds), and 4 (black circles) and SOPs is shown with lengths N/2 (white triangles), N/3 (white squares), N/5 (black triangles) and N/6 (black squares). The critical point for this example transition, which was identified using infinite-size DMRG simulations, is $h_2$/J=0.423. In the area to the right of the vertical line, the correlation length exceeds the system size, and finite-size effects can affect the results. FIG. 2D shows that, according to some embodiments, QCNN can be implemented with fewer input copies throughout the parameter regime, especially near the critical point.

Figure 2E:
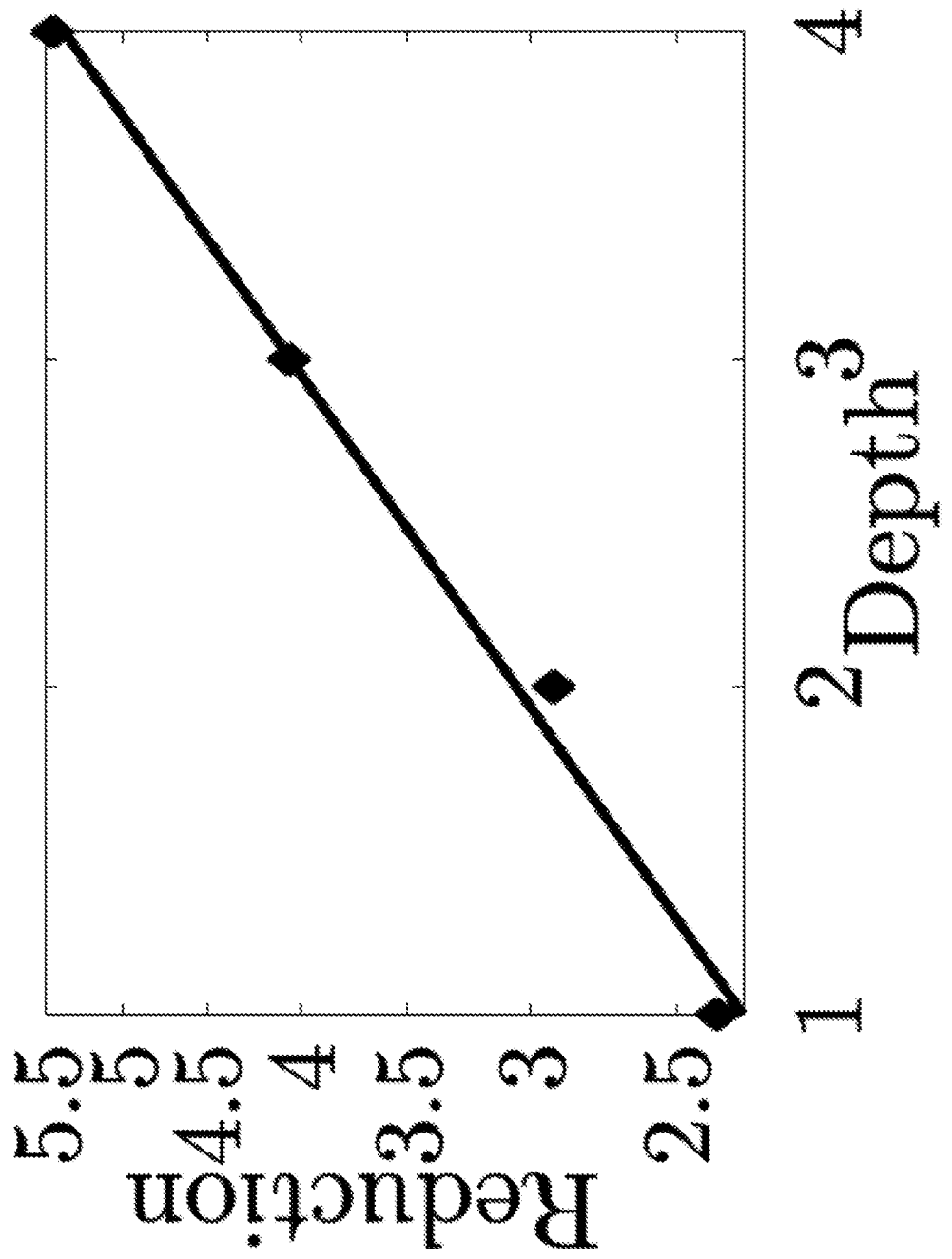

In addition, although the SOP sample complexity scales independently of string length, the QCNN sample complexity consistently improves with increasing depth. Without being bound by theory, these analytical and non-limiting results are limited only by finite size effects in simulations. For example, compared with SOPs, the QCNN reduces sample complexity by a factor that scales exponentially with the depth of the QCNN in numerically accessible regimes as shown in FIG. 2E, which is a graph showing the ratio of SOP sample complexity to QCNN sample complexity plotted as a function of d on a logarithmic scale for $h_1$/J=0.5, $h_2$/J=0.3918, and N=135 spins. In an example physical implementation, this can directly translate to a reduction in the number of experimental repetitions that need to be performed. In the numerically accessible regime (e.g., where simulations are not limited by effects arising from finite system size), this reduction of sample complexity scales exponentially as $1.73e^{0.28d}$. Such scaling can arise from the iterative QEC performed at each depth. As discussed in more detail below, example QCNN circuits can measure a multiscale string order parameter—a sum of products of exponentially many different SOPs that remains sharp up to the phase boundary, thereby indicating effective discrimination between different phases even close to the phase boundary.

Figure 3B:
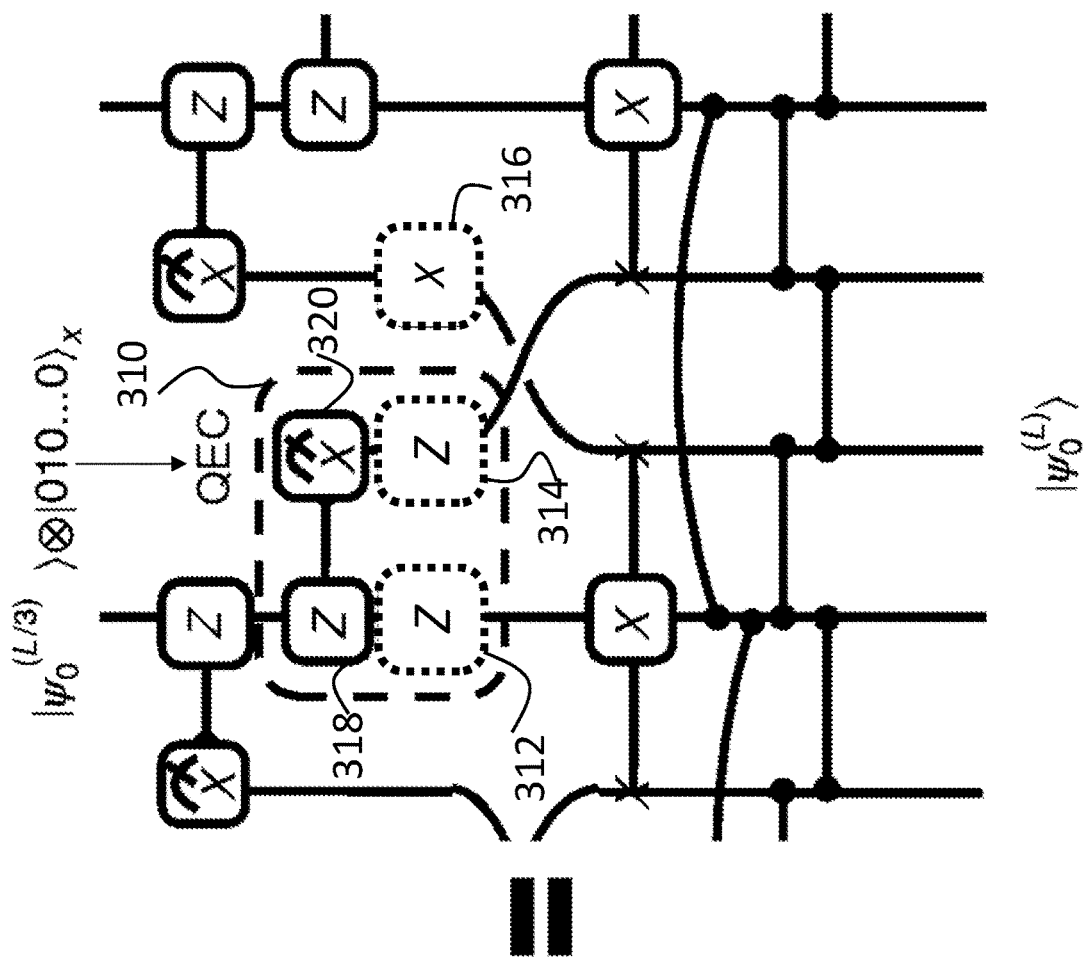
FIGS. 3A-3B are diagrams showing example quantum convolutional neural network circuits, according to some embodiments.
Figure 3A:
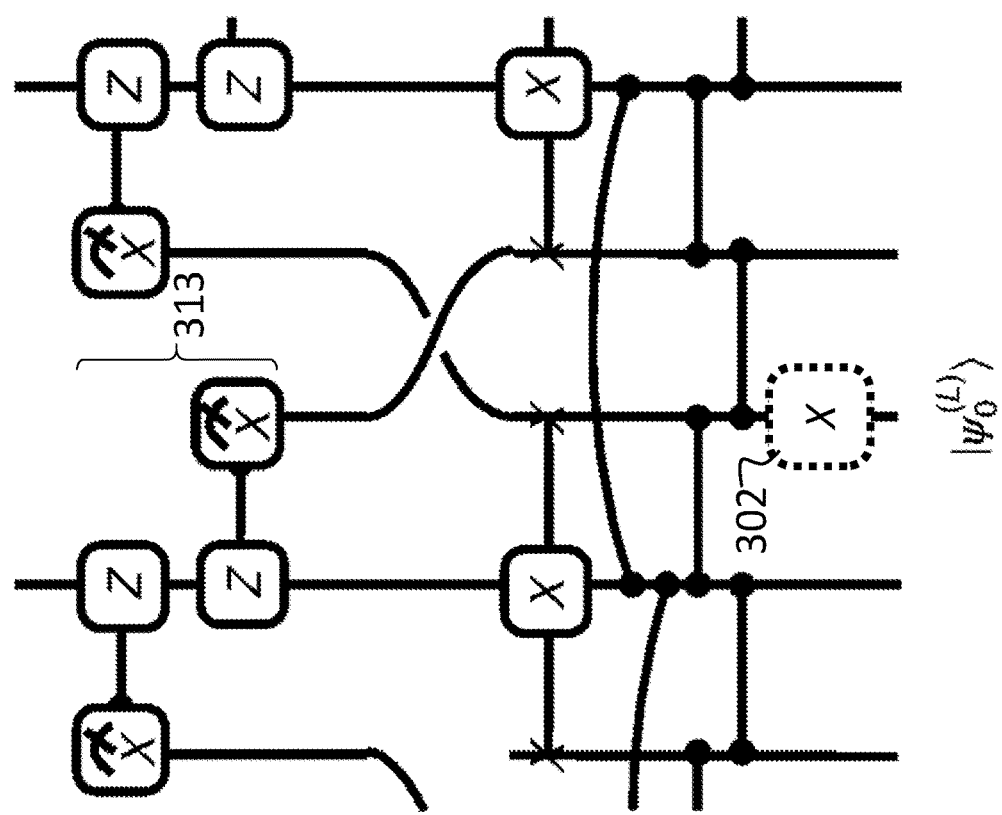

Without being bound by theory, in some embodiments the performance of the QCNN can be demonstrated by analogy to MERA and QEC. For example, QCNN can be specifically designed to contain the MERA representation of the 1D cluster state ($|\psi_0\rangle$) such that it becomes a stable fixed point. The 1D cluster state is the state generated by applying controlled-phase gates to all pairs of nearest-neighbor qubits starting from a product state of all qubits in an equal symmetric superposition of $|0\rangle$ and $|1\rangle$ states (note that in some embodiments, the 1D cluster state is a ground state of the Hamiltonian of Equation (3) when $h_1=h_2=0$). In other words, for a 1D cluster state, the QCNN circuit can be designed to produce another 1D cluster state of reduced size after each convolution-pooling unit. Thus, when $|\psi_0\rangle$ is used as input, each convolution-pooling unit produces the same state $|\psi_0\rangle$ with reduced system size in the unmeasured qubits, while yielding deterministic outcomes (X=1) in the measured qubits. The fully connected layer measures the SOP for $|\psi_0\rangle$. Without being bound by theory, when an input wavefunction is perturbed away from $|\psi_0\rangle$, the QCNN circuit can be analogized to a correction of such 'errors' from the state $|\psi_0\rangle$. For example, as shown in FIG. 3A and FIG. 3B, if a single X error occurs 302, the error can propagate through the first set of convolution layers to a product of Z and X errors 312, 314, 316, if it does not commute with this first set of convolution layers applied. The first pooling layer 310 can identify the location of the original error and propagated errors based on the location of X=−1 measurement results 320 in the measured qubits and unitary Z-rotations 313, 318 controlled on these measurement outcomes can correct the error propagated through the circuit. Similarly, if an initial state has multiple, sufficiently separated errors (possibly in coherent superpositions), the error density after several iterations of convolution and pooling layers can be substantially smaller. If the input state converges to the fixed point, the QCNN can classify it into the SPT phase with high fidelity. Accordingly, without being bound by theory, embodiments of this mechanism resemble the classification of quantum phases based on renormalization-group flow.

In some embodiments, the disclosed QCNN architecture can be implemented on several physical platforms. Such implementations of QCNNs can involve preparation of quantum many-body input states, application of two-qubit gates at various length scales and projective measurements. For physical systems such as certain existing setups with qubits encoded in atomic states where intermediate qubit measurement and feed-forwarding is difficult, such intermediate measurements and feed-forwarding can be replaced. One non-limiting example involves the replacement of the measurement of a first qubit and single-qubit rotation of a second qubit by a unitary V+ if the measurement results in +1, and V− if the measurement results in −1. To replace this, an entangling two-qubit unitary between the first and second qubits can be performed, in which the first qubit acts as a control qubit and determines a rotation operator to apply to the second, target qubit. In the computational basis of the control and target qubits, the matrix corresponding to this entangling two-qubit unitary is a 4×4 block diagonal matrix, with V+ in the upper left block and V− in the lower right block. The first qubit can then be disregarded in the remainder of the QCNN circuit. For example, the circuit will proceed as if this first qubit does not exist, and this first qubit will not be considered when determining the minimum distance between any two qubits. The first qubit may or may not be measured at the end of the QCNN circuit. While this non-limiting example involves a controlled-unitary operation between one control qubit and one target qubit, a person of skill in the art would understand from the present disclosure that this replacement of intermediate measurements can be generalized to cases of multiple control qubits, multiple target qubits, and/or controlled-quantum-channels instead of controlled-unitaries. These capabilities can be applied to multiple programmable quantum simulators consisting of $N \geq 50$ qubits based on trapped neutral atoms and ions, or superconducting qubits.

As an example, a protocol of an exemplary, exact cluster QCNN circuit of FIG. 2B can be implemented via neutral Rydberg atoms, where long-range dipolar interactions can allow high-fidelity entangling gates among distant qubits in a variable geometric arrangement. The qubits can be encoded in the hyperfine ground states, where one of the states can be coupled to the Rydberg level to perform efficient entangling operations via the Rydberg-blockade mechanism.

In some embodiments, to compute the gate depth of an example cluster QCNN circuit in a Rydberg atom implementation, each gate in FIG. 2B can be implemented as described below, while replacing pooling layer measurements by controlled two-qubit operations as discussed above. The multi-qubit gates can be implemented as:

$$C_z Z_{ij} = e^{i\pi(-1+z_i)(-1+z_j)/4}$$

$$C_x Z_{ij} = e^{i\pi(-1+x_i)(-1+z_j)/4}$$

$$C_x C_x X_{ijk} = e^{i\pi(-1+x_i)(-1+x_j)(-1+x_k)/8}$$

These example equations represent the unitary matrices corresponding to the quantum gates illustrated in FIG. 2B, in some embodiments. In an example non-limiting physical system with qubits encoded in the ground states of neutral atoms, $C_z Z_{ij}$ and $C_z C_z X_{ijk} = e^{i\pi(-1+z_i)(-1+z_j)(-1+z_k)/8}$ by applying a sequence of laser pulses that can excite electrons in one of the ground states to a Rydberg state. The desired $C_x Z_{ij}$ and $C_x C_x X_{ijk}$ gates can then be obtained by implementing $C_z Z_{ij}$ and $C_z C_z X_{ijk}$ gates together with single-qubit rotations before and after the gates. For an input size of N spins, the kth convolution-pooling layer would apply $4N/3^{k-1}$ $C_z Z_{ij}$ gates, $N/3_{k-1}$ $C_x C_x X_{ijk}$ gates and $2N/3^{k-1}$ layers of $C_x Z_{ij}$ gates. In some embodiments, the depth of single-qubit rotations is 4d, since these rotations can be implemented in parallel on all N qubits. The fully connected layer can consist of $N3^{1-d}$ $C_z Z_{ij}$ gates. Thus, in some embodiments, the total number of multi-qubit operations for a QCNN of depth d operating on N spins is $$\frac{7N}{2}(1 - 3^{1-d}) + N3^{1-d}.$$

In some embodiments, swap gates are not used since the Rydberg interaction is long-range.

For an example effective coupling strength $\Omega \approx 2\pi \times 10\text{-}100$ MHz and single-qubit coherence time $\tau 200$ µs limited by the Rydberg state lifetime, approximately $\Omega\tau \approx 2\pi \times 10^3\text{-}10^4$ multi-qubit operations can be performed, and a d=4 QCNN on $N \approx 100$ qubits can be implemented.

In some embodiments, QCNN can be trained to distinguish between various quantum states. For example, a QCNN circuit to distinguish states in $\mathcal{P}$ can be obtained using a learning procedure.

Figure 8:
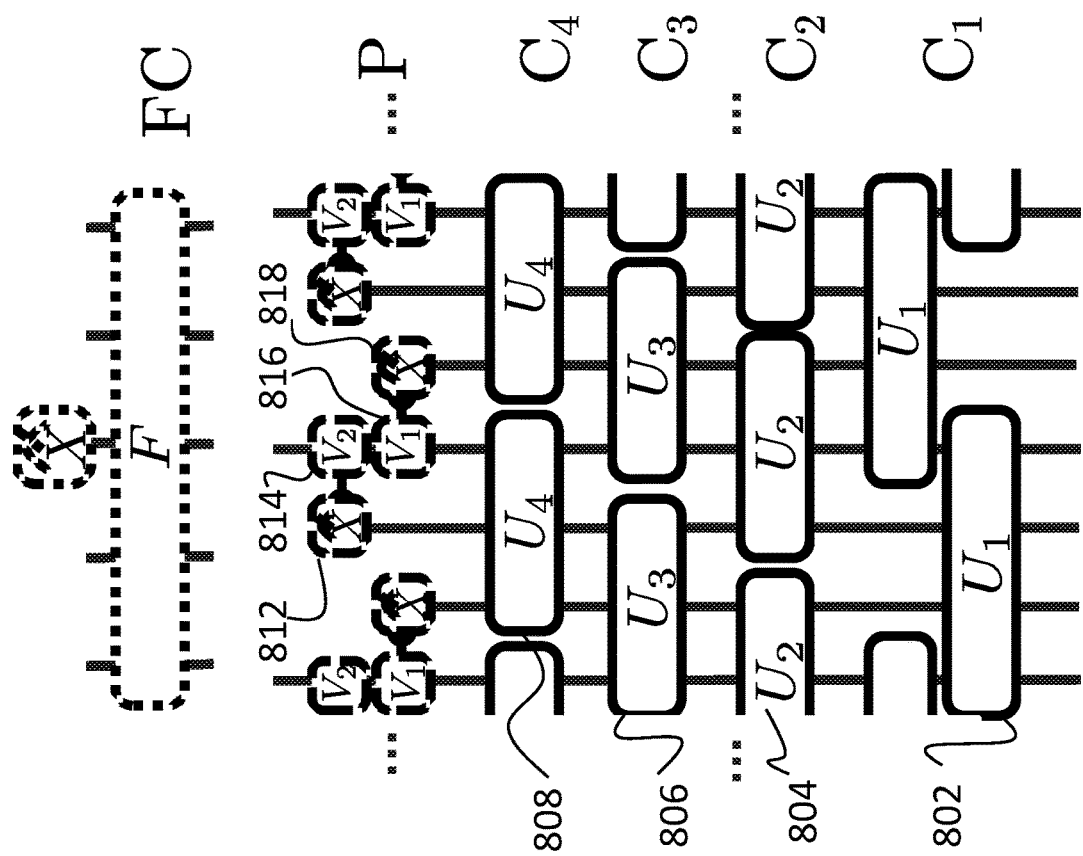
FIG. 8 is a diagram showing details of example hyperparameters of a QCNN circuit, according to some embodiments.

In some embodiments, the learning procedure can begin by selecting hyperparameters for QCNN. FIG. 8 is a diagram showing details of example hyperparameters of a QCNN circuit for generic (1D) phases, according to some embodiments. In some embodiments, the hyperparameters of the QCNN can include a single integer n that determines the reduction of system size in each pooling layer, L→L/n, which is set to 3 in FIG. 8. The first convolution layer can involve (n+1)-qubit unitaries (e.g., 4-qubit unitaries 802 in convolution layer $C_1$) starting on every nth qubit. This is followed by n layers of n-qubit unitaries (e.g., unitaries 804, 806, 808 in layers $C_2$, $C_3$, $C_4$) arranged as shown in FIG. 8. The pooling layer P can measure n−1 out of every contiguous block of n qubits (e.g., every 2 of 3 qubits in measurement steps 812, 818). Each measurement can be followed with a unitary $V_j$ 814, 816 applied to the remaining qubit in the contiguous block, depending on the measurement outcome. For example, the QCNN circuit can apply one unitary $V_{j,+}$ when the measurement results in +1, and another unitary $V_{j,-}$ when the measurement results in −1. This set of convolution and pooling layers can be repeated d times, where d is the QCNN depth. Finally, the fully connected layer can consist of an arbitrary unitary F on the remaining $N/n^d$ qubits, if $N/n^d$ is a constant independent of the number N of input qudits (which is the case when d is approximately the logarithm of N with base 3). The classification output can be given by the measurement output of the middle qubit (or any fixed choice of one qubit). In the present non-limiting example, n=3 because the Hamiltonian in equation 2 involves three-qubit terms.

In a non-limiting example simulation, N=15 spins and QCNN depth d=1 are used to reduce the amount of computing resources used. The example unitaries are parametrized as exponentials of generalized a×a Gell-Mann matrices $\{\Lambda_j\}$, where $a=2^v$, v is the number of qubits involved in the unitary, and $c_j$ are parameters of the unitaries to be learned in the training procedure:

$$U = \exp\left(-i\sum_j c_j \Lambda_j\right).\qquad \text{Equation 7}$$

In some embodiments, this parametrization can be used directly for the unitaries in the convolution layers $C_2$-$C_4$, the pooling layer and the fully connected layer. For the first convolution layer $C_1$, the choice of $U_1$ can be restricted to a product of six two-qubit unitaries between each possible pair of qubits: $U_1=U_{(23)}U_{(24)}U_{(13)}U_{(14)}U_{(12)}U_{(34)}$, where $U_{(\alpha\beta)}$ is a two-qubit unitary acting on qubits indexed by α and β. In some embodiments, such two-qubit unitaries can be easier to implement compared to four-qubit unitaries in some example physical systems. For example, in a non-limiting example in which qubits are encoded in neutral atoms coupled to Rydberg states, the unitaries $U_{(\alpha\beta)}$ can be controlled rotations of a target qubit by some arbitrary angle around some arbitrary axis, depending on the state of the control qubit.

In the QCNN learning procedure, all parameters $c_\mu$ can be initially set to random values between 0 and 2π for the unitaries $\{U_i, V_j, F\}$. In some gradient descent implementations, in each iteration the derivative of the mean-squared error function (equation (1)) can be computed to first order with respect to each $c_\mu$ by using the finite-difference method:

$$\frac{\partial MSE}{\partial c_\mu} = \frac{1}{2\epsilon}(MSE(c_\mu + \epsilon) - MSE(c_\mu - \epsilon)) + O(\epsilon^2)\qquad \text{Equation 8}$$

Without being bound by theory, each coefficient can thus be updated as $$c_\mu \mapsto c_\mu - \eta\frac{\partial MSE}{\partial c_\mu},$$

where η is the learning rate for that iteration. The learning rate can be computed using the bold driver technique from machine learning, where η is increased by 5% if the error has decreased from the previous iteration and decreased by 50% otherwise. This gradient descent procedure can be repeated until the error function changes on the order of $10^{-5}$ or less between successive iterations. A person of skill in the art would understand from the present disclosure that another error function threshold could be chosen. In some example simulations, $\epsilon=10^{-4}$ for the gradient computation and an initial learning rate is set to $\eta_0=10$. A person of skill in the art would also understand from the present disclosure that other values of E and/or the initial learning rate could be chosen.

In an example physical application, in some embodiments the unitary gates can correspond to controlled-rotations of a target electron's spin around some axis by some amount depending on the state of a control qubit. In some embodiments, the unitaries $U_i$, $V_j$, F of FIG. 8 can then be parametrized by the numbers which determine the axis or amount of rotation. In some embodiments, the training procedure can then comprise of: (1) applying the QCNN circuit with an initial set of parameters multiple times to estimate the initial value of the cost function (e.g. Equation (2)), (2) for each parameter, varying the parameter slightly and applying the resultant QCNN circuit multiple times to estimate the change in the cost function due to this variation, and (3) for each parameter, updating the parameter based on the result of (2) in the direction which optimizes the cost function.

Figure 4:
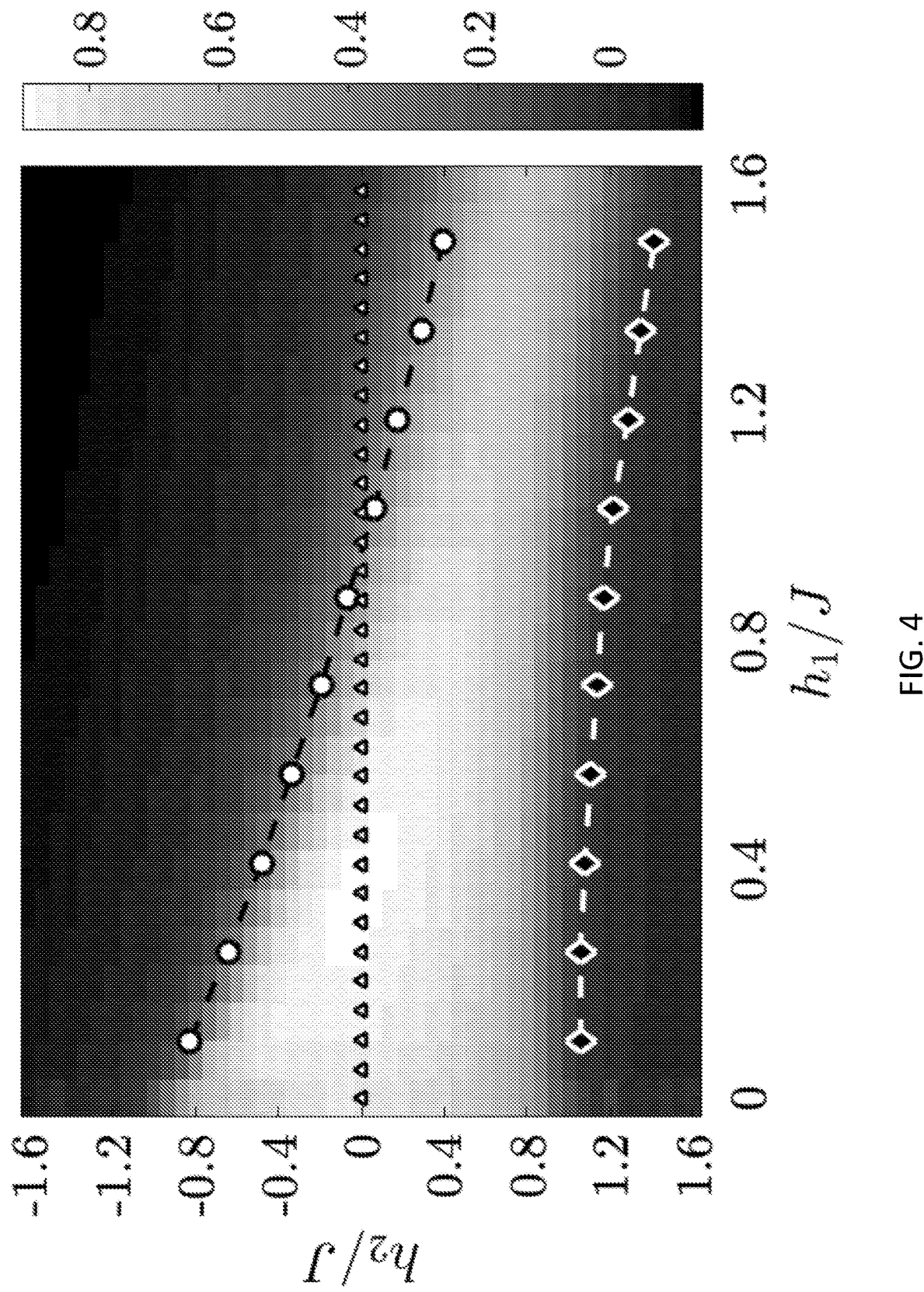
FIG. 4 is a graph showing the performance of an example quantum convolutional neural network circuit trained to detect phase transitions, according to some embodiments.

FIG. 4 is a graph showing the performance of numerically simulating a QCNN which was numerically trained to solve the QPR problem discussed above, according to some embodiments. In the nonlimiting example numerical simulation of the training procedure, all unitaries can be initially set to random values. The example simulation uses a small system with N=15 spins and QCNN depth d=1 to conserve computing resources, but other system sizes and depths are contemplated. In this example simulation there are a total of 1,309 parameters to be learned. The example training data consists of 40 evenly spaced points $h_1 \in [0, 2]$ along the line $h_2=0$ which is shown as triangles in FIG. 4, where the Hamiltonian is exactly solvable by the Jordan-Wigner transformation. Using gradient descent with the MSE function in equation 2, the unitaries can be iteratively updated until convergence. The classification output of the resulting QCNN for generic $h_2$ is shown as a grayscale in FIG. 4. In addition, the white circles and diamonds represent numerically calculated phase transition points extracted from infinite-size DMRG numerical simulations. As shown in FIG. 4, the simulated QCNN accurately reproduces the two-dimensional phase diagram over the entire parameter regime, despite being trained only on samples from a set of solvable points that do not even cross the lower phase boundary.

This non-limiting example illustrates how the QCNN structure can avoid overfitting to training data with its exponentially reduced number of parameters. While the training dataset for this particular QPR problem consists of solvable points, more generally, such a dataset can be obtained by using traditional methods (such as measuring SOPs) to classify representative states that can be efficiently generated either numerically or experimentally.

As discussed above, the (spin-½) 1D cluster state belongs to an SPT phase protected by $\mathbb{Z}_2 \times \mathbb{Z}_2$ symmetry, a phase that also contains the celebrated S=1 Haldane chain, which is a chain of spin-1 particles in the ground state of the Hamiltonian of equation (9) below. Without being bound by theory, in some embodiments QCNN circuits can be used to detect the phase transition between the Haldane phase (i.e., the SPT phase) and an S=1 paramagnetic phase.

Without being bound by theory, the following one-parameter family of Hamiltonians can be considered for the Haldane phase defined on a 1D chain of N spin-1 particles with open boundary conditions:

$$H_{Haldane} = J\sum_{j=1}^{N} S_j \cdot S_{j+1} + \omega \sum_{j=1}^{N} (S_j^z)^2 \quad \text{Equation 9}$$

where $S_j$ denotes the vector of S=1 spin operators at site j, and J, ω are parameters of the Hamiltonian. The system can then be protected by a $\mathbb{Z}_2 \times \mathbb{Z}_2$ symmetry generated by global π-rotations of every spin around the X and Y axes:

$$R_x = \prod_j e^{i\pi S_j^x}, \quad R_y = \prod_j e^{i\pi S_j^y}. \quad \text{Equation 10}$$

When ω is zero or small compared to J, the ground state of Equation (9) belongs to the SPT phase, but when ω/J is sufficiently large, the ground state becomes paramagnetic.

To apply embodiments of a QCNN circuit as shown in FIG. 2B to this Haldane phase, a quasilocal isometric map U between the two models should be identified, because their representations of the symmetry group are distinct. For example, since the cluster model has a $\mathbb{Z}_2 \times \mathbb{Z}_2$ symmetry generated by $X_{even(odd)} = \prod_{i \in even(odd)} X_i$, an example choice of quasilocal isometry can map $UR_x U^\dagger = X_{odd}$ and $UR_y U^\dagger = X_{even}$. Without being bound by theory, this extends the local Hilbert space of a spin-1 particle by introducing a spin singlet state |s⟩ and mapping it to a pair of spin-½ particles: $|x\rangle \mapsto |+-\rangle$, $|y\rangle \mapsto -|-+\rangle$, $|1\rangle \mapsto -i|--\rangle$, $|1\rangle \mapsto |++\rangle$. Here, |±⟩ denote the |±1⟩ eigenstates of the (spin-½) Pauli matrix X. |μ⟩ denotes a spin-1 state defined by $R_\nu|\mu\rangle = (-1)^{\delta_{\mu,\nu}+1}|\mu\rangle$ (μ, ν ∈ {x, y, z}). The QCNN circuit for the Haldane chain thus can consist of applying U followed by the circuit presented above in FIG. 2B.

Figure 10:
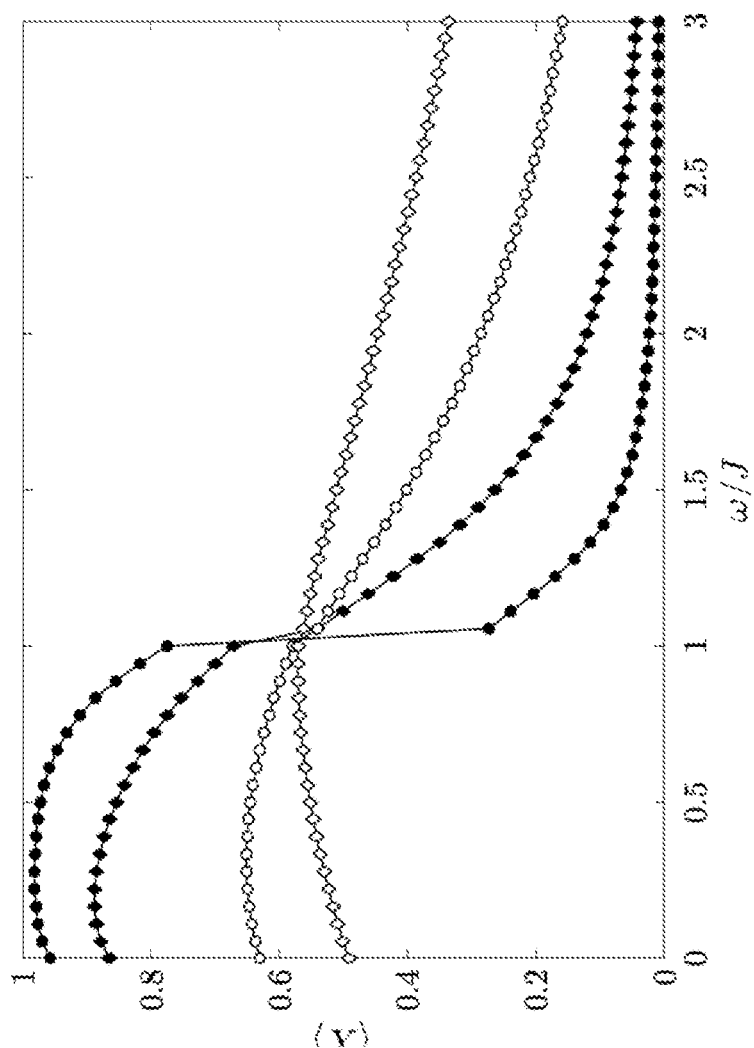
FIG. 10 is a graph showing an example QCNN output, according to some embodiments.

FIG. 10 shows an example QCNN output for an input system of N=54 spin-1 particles at d=1 (white diamonds), 2 (white circles), 3 (black diamonds), and 4 (black circles), obtained using matrix product state simulations with D=160. The critical point in this example is identified as ω/J=1.035±0.005 by using DMRG to obtain the second derivative of energy density as a function of ω and J. The QCNN provides accurate identification of the phase transition.

Without being bound by theory, embodiments of the final operator in the Heisenberg picture measured by the exemplary QCNN circuit of FIG. 2B that recognizes the SPT phase are described below. Although some embodiments of a QCNN circuit perform non-unitary measurements in the pooling layers, similar to QEC circuits, all measurements can be postponed to the end by replacing pooling layers with unitary-controlled gates acting on both measured and unmeasured qubits, as discussed previously. Without being bound by theory, in this way, the QCNN can be analogized to measuring a non-local observable $$\mathcal{O} = (U_{CP}^{(d)} \ldots U_{CP}^{(1)})^\dagger Z_{i-1} X_i Z_{i+1} (U_{CP}^{(d)} \ldots U_{CP}^{(1)}) \quad \text{Equation 11}$$

where i is the index of the measured qubit in the final layer and $U_{CP}^{(l)}$ is the unitary corresponding to the convolution-pooling unit at depth l. A more explicit expression of $\mathcal{O}$ can be obtained by commuting $U_{CP}$ with the Pauli operators, which yields recursive relations:

$$U_{CP}^\dagger X_i U_{CP} = X_{i-2} X_i X_{i+2} \quad \text{Equation 12}$$

$$U_{CP}^\dagger Z_i U_{CP} = \tfrac{1}{2}(Z_i + Z_{i-2} X_{i-1} + X_{i+1} Z_{i+2} - Z_{i-2} X_{i-1} Z_i X_{i+1} Z_{i+2}) \quad \text{Equation 13}$$

where ĩ enumerates every qubit at depth l−1, including those measured in the pooling layer. In some embodiments, it follows that an SOP of the form ZXX . . . XZ at depth l transforms into a weighted linear combination of 16 products of SOPs at depth l−1. Thus, instead of measuring a single SOP, embodiments of a QCNN circuit can measure a sum of products of exponentially many different SOPs:

$$O = \sum_{ab} C_{ab}^{(1)} S_{ab} + \sum_{a_1 b_1 a_2 b_2} C_{a_1 b_1 a_2 b_2}^{(2)} S_{a_1 b_1} S_{a_2 b_2} + \cdots \quad \text{Equation 14}$$

Without being bound by theory, $\mathcal{O}$ can be viewed as a multiscale SOP with coefficients computed recursively in d using equations (12) and (13). This allows embodiments of the QCNN to produce a sharp classification output even when the correlation length is as long as $3^d$.

Without being bound by theory, in some embodiments, to construct the exact QCNN circuit in FIG. 2B, the convolution and pooling layers can be designed to satisfy the following two properties:
1. Fixed-point criterion: If the input is a cluster state |ψ₀⟩ of L spins, the output of the convolution-pooling layers is a cluster state |ψ₀⟩ of L/3 spins, with all pooling layer measurements deterministically yielding |0⟩.
2. QEC criterion: If the input is not |ψ₀⟩ but instead differs from |ψ₀⟩ at one site by an error that commutes with the global symmetry, the output should still be a cluster state of L/3 spins, but at least one of the measurements will result in the state |1⟩.

Two similar, desirable, nonlimiting properties can be identified for any quantum circuit implementation of RG flow for performing more generic QPR problems involving SPT phases.

In an example Hamiltonian that was previously considered, a ground state (1D cluster state) is a graph state, which can be efficiently obtained by applying a sequence of controlled-phase gates to a product state. This can simplify the construction of the MERA representation for the fixed-point criterion. To satisfy the QEC criterion discussed above, the ground state manifold of the unperturbed Hamiltonian:

$$H = -J \sum_i Z_i X_{i+1} Z_{i+2} \quad \text{Equation 15}$$

can be treated as the code space of a stabilizer code with stabilizers $\{Z_i X_{i+1} Z_{i+2}\}$. The remaining degrees of freedom in the QCNN convolution and pooling layers can then be specified such that the circuit detects and corrects the error (e.g., it measures at least one |1⟩ and prevents propagation to the next layer) when a single-qubit X error is present.

In addition to distinguishing between different phases for a set of input qubits, embodiments of the disclosed QCNN techniques can be used to optimize QEC codes. Without being bound by theory, in some embodiments, training QCNN can be analogized to QEC optimization, where the QEC operations are optimized to ultimately produce a QCNN output that adequately characterizes the trained input states. In such an embodiment, the QCNN structure can allow for simultaneous optimization of efficient encoding and decoding schemes with rich entanglement structure. In some non-limiting example applications of QCNN to QEC optimization, an inverse QCNN operation can be applied to a single qubit, which results in the state of the single qubit being stored across multiple qubits. After a period of time where noise may act on the multiple qubits and introduce errors, a QCNN operation can be performed on the multiple qubits to reduce the system back to a single qubit and correct the introduced errors. The inverse QCNN and QCNN operations can be optimized to prepare a state of multiple qubits from which errors due to noise can be corrected with the QCNN operation. Accordingly, the state of a single qubit can be stored for an extended period of time without introduction of errors from noise.

Figure 5A:
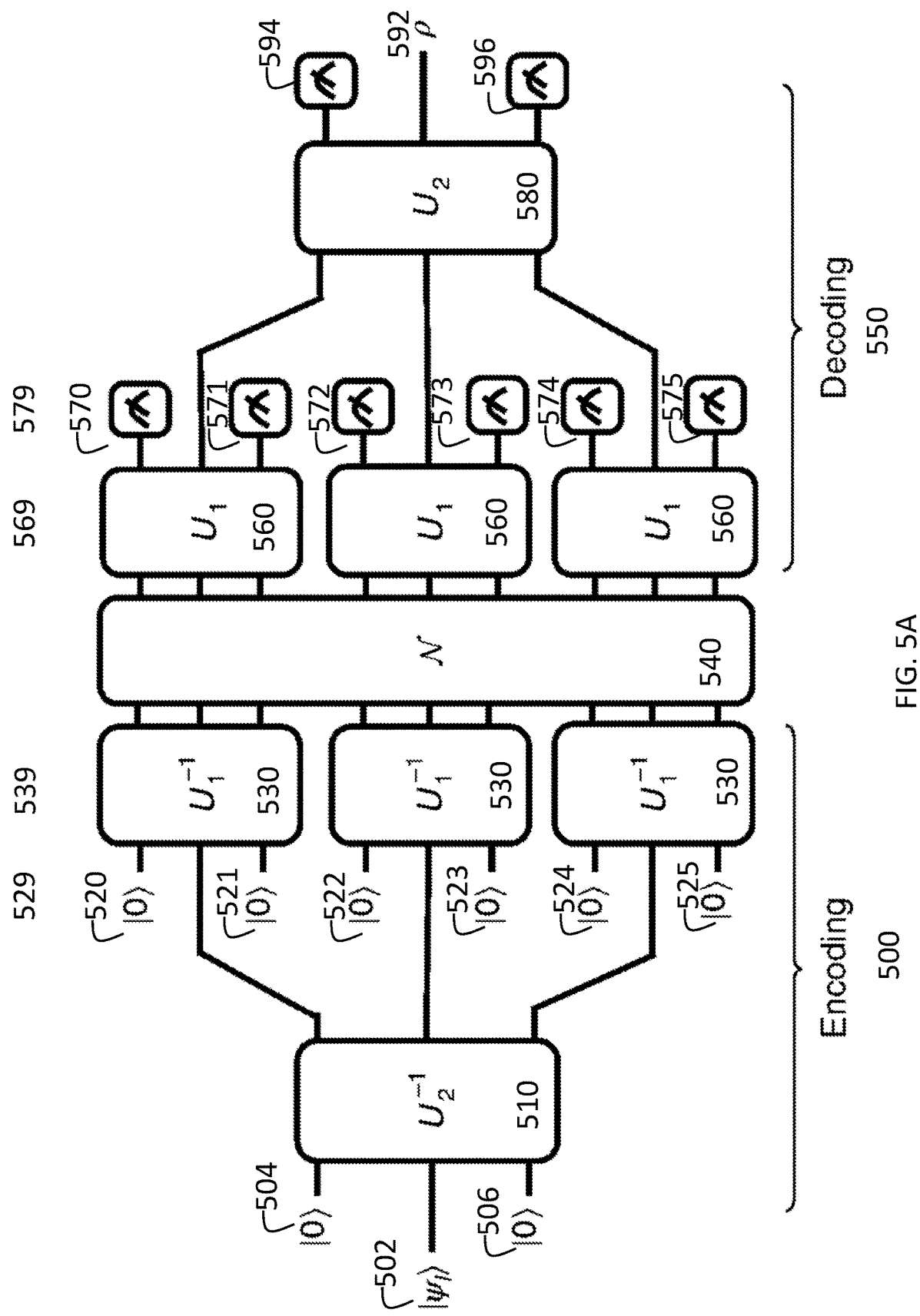
FIG. 5A is a diagram of an example quantum error correction circuit with the structure of a quantum convolutional neural network, according to some embodiments.

FIG. 5A shows a non-limiting example of using QCNN techniques to optimize QEC for a particular error model. As shown in FIG. 5A, in some embodiments, the method begins with the inverse QCNN operation 500, which encodes a single logical qubit in state $|\psi_l\rangle$ 502 into nine physical qubits 540 which undergo noise $\mathcal{N}$. Such an encoding scheme can begin with a set C of logical qubits to protect against noise, which in this non-limiting example comprises the single logical qubit in state $|\psi_l\rangle$ 502. The encoding scheme can then proceed by enlarging the set C with a set A of additional qubits prepared in a predetermined state, which in this case comprises two additional qubits 504 and 506 prepared in the state |0⟩. The encoding scheme can then apply a fully connected unitary, in this case $U_2^{-1}$ 510, to the enlarged set C of qubits. Next, an expansion layer EL 529 can be applied to the set C of qubits. In this non-limiting example, EL begins by dividing the set C of qubits into three expansion subgroups, one subgroup for each qubit of C. For each of these expansion subgroups, EL forms a set S comprising the single qubit in that expansion subgroup and two expansion qubits (520 and 521, or 522 and 523, or 524 and 525 respectively for each subgroup), applies a unitary 530 to S, and adds the additional expansion qubits to C. In this non-limiting example, the expansion unitary is the identity map for all expansion subgroups, and the identity maps are not shown in the figure. In some embodiments, expansion layers such as EL can correspond to inverse-pooling layers in an inverse QCNN circuit. Next, a convolving layer CL 539 can be applied to the set C of qubits, by performing convolving unitaries $U_1^{-1}$ 530 to convolving subgroups of the set C. In some embodiments, convolving layers such as CL can correspond to inverse-convolving layers in an inverse QCNN circuit. Thus, in the non-limiting example, the encoding operation 500 can comprise an enlarging step, a fully connected unitary 510, one expansion layer 529, and one convolving layer 539. After a period of time where the nine qubits 540 undergo noise $\mathcal{N}$, QCNN 550 decodes the nine qubits to obtain the logical state ρ 592. In this decoding operation, the last applied layer, which in this example is a convolving layer CL 539, is reversed by applying its inverse layer 569. Because CL is a convolving layer, its inverse layer is an inverse convolving layer 569 which can comprise applying the inverse-unitaries $U_1$ 560 of the convolving unitaries $U_1^{-1}$ 530. In some embodiments, inverse convolving layers such as the inverse layer of CL can correspond to convolving layers in a QCNN circuit. The next last applied layer, which in this example is an expansion layer EL 529, is then reversed by applying its inverse layer 579. Because EL is an expansion layer, its inverse layer is an inverse expansion layer 579, which can also be called the pooling layer, which comprises, for each expansion subgroup ES of EL, applying the inverse of the unitary that was applied to the set S comprising the qubits of ES and the expansion qubits corresponding to ES, measuring those additional expansion qubits (570 and 571, 572 and 573, or 574 and 575, depending on the choice of ES), applying a unitary to the qubits of ES based on the outcomes of the measurement, and removing the corresponding expansion qubits from the set C. In this non-limiting example, the unitary applied to the qubits of each expansion subgroup ES is the identity map, which is not shown in the figure. In some embodiments, inverse expansion layers such as the inverse layer of EL can correspond to pooling layers in a QCNN circuit. Next, the inverse unitary $U_2$ 580, which is the inverse of the fully connected unitary $U_2^{-1}$ 510, can be applied to the set C. Finally, the state of the additional qubits of set A is measured 594 and 596, similar to the measurement performed in a QCNN circuit after a fully connected unitary (e.g. the measurement 162 discussed above with reference to FIG. 1B). Thus, in the non-limiting example, the decoding operation 550 can comprise one inverse convolving layer 569, one inverse expansion layer 579, an inverse fully connected unitary 580, and measurements 594 and 596. In some embodiments, the inverse QCNN encoding operation and QCNN decoding operation can be optimized to maximize $\langle\psi_l|\rho|\psi_l\rangle$, where ρ 592 is the state of the one or more qubits that remain after the QCNN procedure.

In some physical realizations, the noise $\mathcal{N}$ may comprise the nine qubits interacting with other degrees of freedom in the physical system, such as thermal photons or a nuclear spin bath, which may cause one or many of the qubits to undergo Pauli-X (bit-flip) or Pauli-Z (phase-flip) errors.

In the above non-limiting example, and without being bound by theory, the inverse QCNN operation 500 can be viewed as an encoding channel from a logical input qubit 502 to physical qubits 540, and the QCNN operation 550 can be viewed as a decoding quantum channel between the physical qubits 540 and the logical output qubit 592. The encoding scheme introduces sets of new qubits 504, 506, 520, 521, 522, 523, 524, 525 in a predetermined state, for example |0⟩, and entangles them with existing qubits in fully connected quantum channels, expansion layers, and convolving layers via unitary gates $U_i^{-1}$. The inverse expansion layers in the decoding scheme perform measurements 570, 571, 572, 573, 574, 575, and the inverse convolving layers 569 and the inverse fully connected unitary 580 in the decoding scheme perform the inverses of $U_i^{-1}$, which are $U_i$. After the inverse fully connected unitary is applied, qubit measurements 594 and 596 are performed. Given an error channel $\mathcal{N}$, the circuit can be optimized to maximize the recovery fidelity $$f = \sum_{|\psi_l\rangle\in\{\pm x,y,z\}} \langle\psi_l|\mathcal{M}^{-1}(\mathcal{N}(\mathcal{M}(|\psi_l\rangle\langle\psi_l|)))|\psi_l\rangle \qquad \text{Equation 16}$$

where $\mathcal{M}(\mathcal{M}^{-1})$ is the encoding (decoding) scheme generated by a QCNN circuit, and $|\pm x, y, z\rangle$ are the $\pm 1$ eigenstates of the Pauli matrices. Thus, in some embodiments, the method simultaneously optimizes both encoding and decoding schemes which can be implemented in physical systems. The variational optimization can be carried out with an unknown $\mathcal{N}$ (i.e., noise that is not understood a priori), since f can be evaluated experimentally based on training data.

While the above non-limiting example uses specific numbers such as two for the number of qubits in A, one for the number of qubits per expansion subgroup in an expansion layer, two for the number of expansion qubits added for each expansion subgroup in an expansion layer, three for the number of convolving subgroups in a convolving layer, and the like, a person of skill in the art would understand from the present disclosure that such numbers are merely examples and can be varied depending on each implementation. Depending on the particular choice of hardware on which to implement this technique, the desired code distance of the resulting QEC code, and other similar factors, such numbers can be varied. Likewise, while the above non-limiting example uses specific unitaries such as the identity map for some of the unitaries in the expansion and inverse-expansion layers, a person of skill in the art would understand from the present disclosure that other unitaries can be used.

While the above non-limiting example contains only one expansion layer and one convolving layer, a person of skill in the art would understand from the present disclosure that such numbers are merely examples and can be varied depending on each implementation. For example, the process of applying expansion and convolving layers to the set C of qubits may be repeated, just as the process of applying convolving and pooling layers to a plurality of input qubits can be repeated in QCNN. As with that case, in some embodiments, the unitaries in the repeated expansion and convolving layers can be different from the unitaries in the initial expansion and convolving layers. However, a person in the skill of art would also understand from the present disclosure that such an extension can involve a more careful book-keeping of the expansion and convolving layers that have been applied in the encoding procedure, to ensure that the layers are properly reversed in the decoding procedure. In some embodiments, this book-keeping can be done by using a list L containing information about at least one property of the layers which have been applied. The list L can be initialized as an empty list after the application of the fully connected unitary in the encoding procedure, and information about at least one property of each expansion or convolving layer can be appended to the end of L as the layer is applied. In some embodiments, properties of an applied layer can include whether the layer is an expansion layer or a convolving layer, the unitaries applied during the layer, the subgroups or sets of qubits to which each unitary was applied, and the like. During the decoding procedure, layers can be reversed by applying the inverse layers of the expansion and convolving layers applied in the encoding procedure, in the opposite order of which the layers were applied in the encoding procedure, based on the information about the at least one property of each layer in the list L. If a layer LL is a convolving layer, the inverse layer of LL is an inverse convolving layer which can comprise applying the inverse-unitaries of the unitaries applied in LL in the reverse order in which the unitaries of LL were applied. If LL is an expansion layer, the inverse layer of LL is an inverse expansion layer which can comprise, for each expansion subgroup ES of LL, identifying the set S comprising the qubits of ES and the expansion qubits corresponding to ES, applying to the qubits of S the inverse of the unitary performed on the qubits of S in LL, measuring the expansion qubits corresponding to ES, performing a unitary operation on the qubits of ES depending on the outcome of the measurement, and removing the expansion qubits corresponding to ES from the set C of qubits. In this way, the list L can be used to ensure that the decoding procedure appropriately reverses all layers applied during the encoding procedure. In some embodiments, such a list L can be stored in a computer readable storage medium.

In some embodiments of this QCNN-based technique for optimization of QEC, one or more of the unitaries in the at least one expansion layer, the at least one convolving layer, the at least one inverse expansion layer, and the at least one inverse convolving layer, and/or the inverse fully connected unitary and the fully connected unitary can be parametrized. The parameters to these unitaries can be optimized to minimize or maximize a particular objective function such as the function in Equation 16. In some embodiments, this optimization comprises initializing all unitaries and successively optimizing them until convergence, for example via gradient descent, as discussed previously. In some embodiments, other optimization techniques or parameter search methods can be used to update the parameters, such as, but not limited to, the Dividing Rectangles method, genetic algorithms, or Nelder-Mead methods.

To illustrate the potential of embodiments of this procedure, a non-limiting example involving N=9 physical qubits and 126 variational parameters can be considered. The circuit evolution of the $2^N \times 2^N$ density matrix can be simulated exactly. The encoding circuit can comprise a fully connected unitary $U_1^{-1}$, an expansion layer which introduces two expansion qubits per expansion subgroup, and a convolving layer $U_2^{-1}$, similar to the circuit shown in FIG. 5A. The decoding circuit can comprise inverse convolving and inverse expansion layers, and the inverse unitary of the fully connected unitary. Without loss of generality and without being bound by theory, the optimization over the expansion layers can be ignored by absorbing its effect into the first convolving layer. However, a person of skill in the art would understand based on the present disclosure that separate convolving and expansion layers can be included. Similarly, other sizes of convolving and expansion layers (e.g., introducing other numbers of additional expansion qubits per expansion subgroup) or more layers may be used. In this example, the generic three-qubit unitary operations $U_1$ and $U_2$ can be parametrized using 63 Gell-Mann coefficients each.

Without being bound by theory, in some embodiments, to evaluate QCNN applied to QEC optimization, three different example input error models can be considered: (1) independent single-qubit errors on all qubits with equal probabilities $p_\mu$ for $\mu$=X, Y and Z errors or (2) anisotropic probabilities $p_x \neq p_y = p_z$, and (3) independent single-qubit anisotropic errors with additional two-qubit correlated errors $X_i X_{i+1}$ with probability $p_{xx}$. For example, the first two error models can be realized by applying a (generally anisotropic) depolarization quantum channel to each of the nine physical qubits:

$$\mathcal{N}_{1,i}: \rho \mapsto \left(1 - \sum_\mu p_\mu\right)\rho + \sum_\mu p_\mu \sigma_i^\mu \rho \sigma_i^\mu \qquad \text{Equation 17}$$

with Pauli matrices $\sigma_i^\mu$ for $i \in \{1, 2, \ldots, 9\}$ (the qubit indices can be identified from bottom to top in FIG. 5A). For the anisotropic case, the QCNN can be trained on various different error models with the same total error probability $p_{tot}=p_x+p_y+p_z=0.001$ but different relative ratios.

Figure 9:
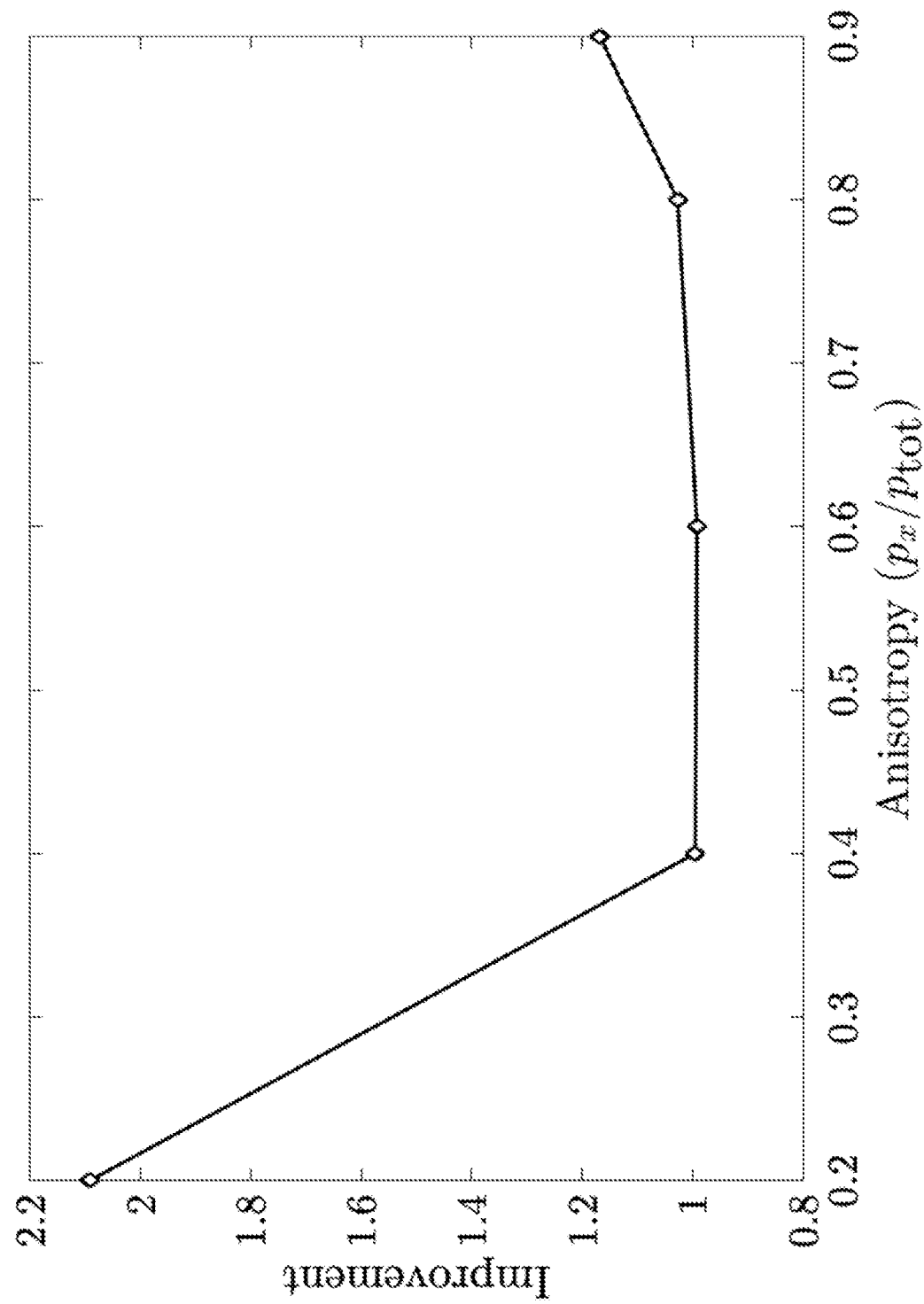
FIG. 9 is a graph showing the improvement of a QEC scheme optimized using QCNN techniques compared to the Shor code as a function of anisotropy, according to some embodiments.

In this non-limiting example, one can compare the result of a QEC scheme optimized using QCNN techniques to the result of the Shor code, which is a well-known QEC code obtained without using QCNN techniques. FIG. 9 shows the ratio between the logical error probability (which can refer to the probability of an error getting past the QEC scheme) of the QCNN code and a Shor code plotted as a function of anisotropy, $p_x/p_{tot}$. Because this ratio of logical error probabilities can characterize the advantage of using the QCNN code compared to a Shor code, the vertical axis in FIG. 9 is labeled as "improvement." In some embodiments, for nearly isotropic models or error model (1), the QCNN can achieve the same logical error rate as the Shor code, while for strongly anisotropic models in error model (2), the QCNN outperforms the Shor code by reducing the error rate by a constant factor up to 50%, depending on the specific input error probability ratios.

Without being bound by theory, in example embodiments of the correlated error model (3), an additional quantum channel can be applied:

$$\mathcal{N}_{2,i}: \rho \longmapsto (1-p_{xx})\rho + p_{xx} X_i X_{i+1} \rho X_i X_{i+1} \quad \text{Equation 18}$$

for pairs of nearby qubits, that is $i \in \{1, 2, 4, 5, 7, 8\}$. In this non-limiting example, the QCNN circuit can be trained on a specific error model with parameter choices $p_x=5.8\times10^{-3}$, $p_y=p_z=2\times10^{-3}$, $p_{xx}=2\times10^{-4}$, and the logical error probabilities can be evaluated for various physical error models with the same relative ratios $p_x:p_y:p_z:p_{xx}$ but different total error per qubit $p_x+p_y+p_z+p_{xx}$. Without being bound by theory, for an anisotropic logical error model with probabilities $p_\mu$ for $\sigma_\mu$ logical errors, the overlap f is $(1-2\Sigma_\mu p_\mu/3)$, since $\langle \pm v | \sigma_\mu | \pm v \rangle = (-1)^{\delta_{\mu,v}+1}$. Because of this, the total logical error probability can be computed from f as $1.5(1-f)$. Optimization can therefore involve maximizing the logical state overlap f defined in equation (16). In some embodiments, if the gradient descent method is applied based on f directly to both $U_1$ and $U_2$, embodiments of the optimization can be trapped in a local optimum. Accordingly, in some embodiments, the two unitaries $U_1$ and $U_2$ can be optimized sequentially, similar to a layer-by-layer optimization in backpropagation for conventional CNN.

Without being bound by theory, since in some embodiments $U_1$ is optimized prior to $U_2$, an efficient cost function $C_1$ for the initial optimization of $U_1$ can be derived that is independent of $U_2$. For example, simply maximizing f with an assumption on $U_2$, for example that it equals the identity, may not be ideal, since such a choice does not capture a potential interplay between $U_1$ and $U_2$. In addition, because in some embodiments $U_1$ captures arbitrary single-qubit rotations, it can be helpful to define $C_1$ independent of basis. Furthermore, the tree structure of the example circuit allows one to view the first layer as an independent quantum channel:

$$\mathcal{M}_{U_i}: \rho \longmapsto tr_a[U_1 \mathcal{N}(U_1^\dagger(|0\rangle\langle 0| \otimes \rho \otimes |0\rangle\langle 0|)U_1)U_1^\dagger] \quad \text{Equation 19}$$

where $tr_a[\cdot]$ denotes tracing over the ancilla qubits that are measured in the intermediate step. From this perspective, $\mathcal{M}_{U_1}$ can describe an effective error model to be corrected by the second layer.

With these considerations, and without being bound by theory, $U_1$ can be optimized such that the effective error model $\mathcal{M}_{U_1}$ becomes as classical as possible. In such an example, $\mathcal{M}_{U_1}$ can be dominated by a 'flip' error along a certain axis with a strongly suppressed 'phase' error. In this regime, the remnant, simpler errors can be corrected by the second layer. For example, $\mathcal{M}_{U_1}$ can be represented using a map $\mathcal{M}_{U_1}: r \longmapsto Mr+c$, where $r \in \mathbb{R}^3$ is the Bloch vector for a qubit state $\rho \equiv \frac{1}{2}1+r\cdot\sigma$, where 1 is the identity operator and $\sigma=(X, Y, Z)$ is the vector of Pauli matrices. The singular values of the real matrix M would encode the probabilities $p_1 \geq p_2 \geq p_3$ for three different types of errors. In some embodiments, the cost function for the first layer can be selected to be $C_1=p_1^2+p_2+p_3$, which can be more sensitive to $p_2$ and $p_3$ than $p_1$ and can ensure that the resultant, optimized channel $\mathcal{M}_{U_1}$ is dominated by one type of error (with probability $p_1$). M can be efficiently evaluated from a quantum device without knowing $\mathcal{N}$, by performing quantum process tomography for a single logical qubit, which can characterize a single-qubit quantum channel by applying the quantum channel to various test states multiple times, and making multiple measurements of the resultant states in various bases. Once $U_1$ is optimized, gradient descent can be used to find an optimal $U_2$ to maximize f. As with QPR, gradients can be computed via a finite-difference method, and the learning rate can be determined by the bold driver technique.

Figure 5B:
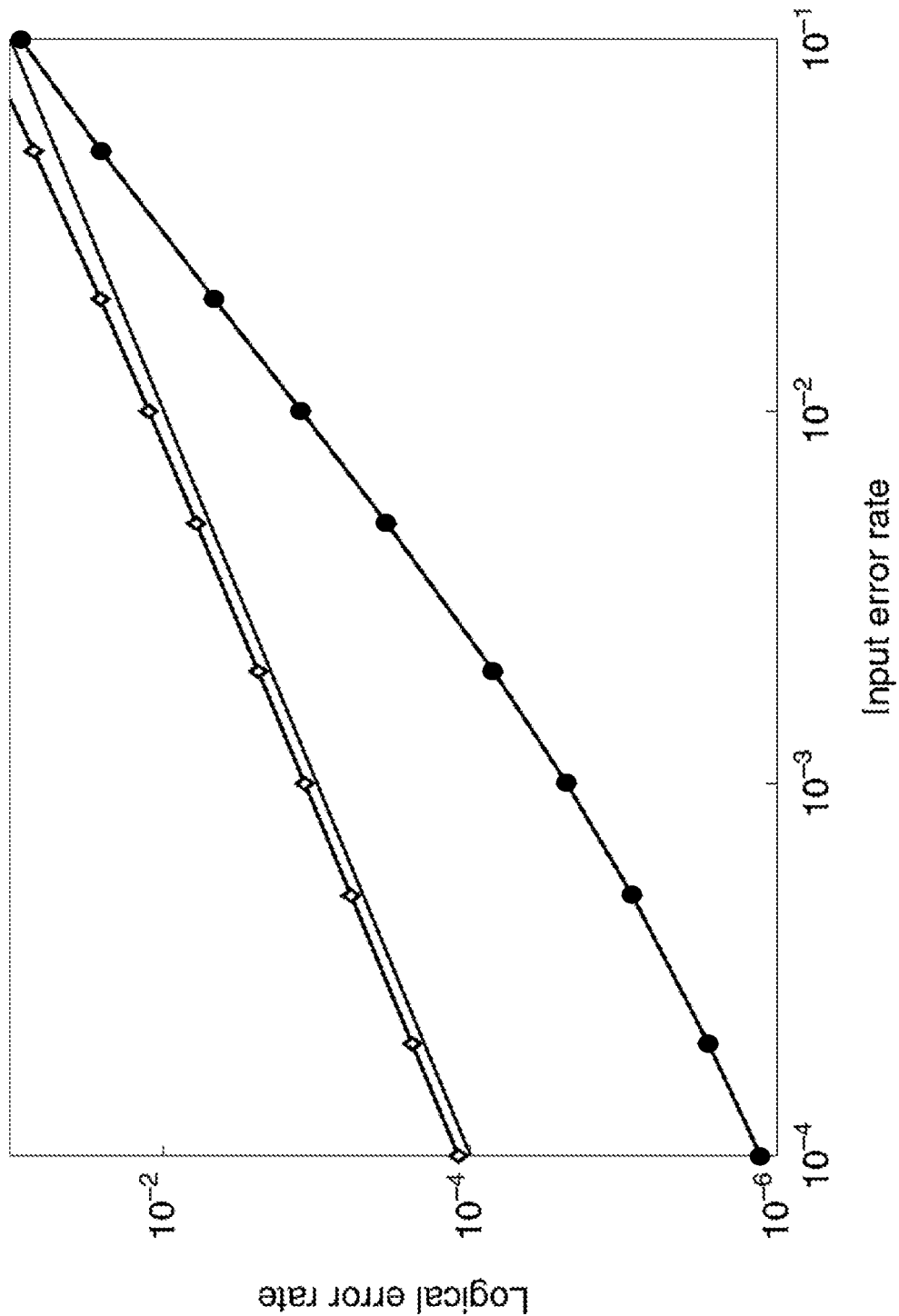
FIG. 5B is a graph showing logical error rates, according to some embodiments.

FIG. 5B is a graph showing the logical error rate of the Shor code (diamonds) versus a learned QEC code (circles) in a correlated error model example simulation using the techniques described above, according to some embodiments. In this embodiment, the input error rate is defined as the sum of all probabilities and $p_\mu$ and $p_{xx}$. As shown in FIG. 5B, the performance of the Shor code is worse than performing no error correction at all (identity, solid line), while the optimized QEC code can still substantially improve the logical error rate compared to the input error rate. This non-limiting example demonstrates the power of using QCNNs to obtain and optimize new QEC codes for realistic, a priori unknown error models.

While the above non-limiting example considered the case where the encoding operation and the decoding operations are both error-free, and qubits only undergo noise during a waiting time in between the encoding and decoding operations, in general, the disclosed method can also be applied when the collection C of qubits can undergo noise at any point during encoding or decoding procedures. Similarly, other extensions can be considered in which a convolving layer is applied before the first expansion layer in the encoding procedure. Likewise, as in the case of QCNNs used for classifying and recognizing phases of matter, other contemplated extensions comprise cases where qubits are replaced by qudits, and/or where measurements are replaced by projections onto a subspace in a set of orthogonal subspaces or by generalized measurements.

While the QCNN circuit structure for recognizing 1D phases is described above, a person of skill in the art would understand from the present disclosure that the QCNN technique can be generalized to higher dimensions, where phases with intrinsic topological order such as the toric code are supported. Nonlocal order parameters can then be identified with low sample complexity for lesser-understood phases such as quantum spin liquids or anyonic chains. To recognize more exotic phases, the translation-invariance constraints of some embodiments can be relaxed, resulting in $O(N \log(N))$ parameters for system size N, or ancilla qubits could be used to implement parallel feature maps following traditional CNN architecture. Further extensions could incorporate optimizations for fault-tolerant operations on QEC code spaces. In addition, while a finite-difference scheme to compute gradients in learning demonstrations is described above, more efficient schemes such as backpropagation can be used, or other techniques (which need not be based on gradients) may be used to find optimal sets of QCNN parameters.

While most examples of the QCNN applications described above use a quantum state as an input state, a person of skill in the art would understand from the present disclosure that QCNN in general can be applied with a classical input state. The QCNN circuit model with a classical input state can be used to tackle classical machine learning tasks, such as recognizing the images of cats and dogs.

The invention claimed is:

1. A method comprising:
   convolving a plurality of input qudits in a classical or quantum state by applying at least one convolving layer of quantum channels to convolving subgroups of the plurality of input qudits, wherein a size of each convolving subgroup of the plurality of input qudits is independent of a number of the plurality of input qudits;
   pooling the plurality of input qudits by applying at least one pooling layer comprising:
      dividing the plurality of input qudits into pooling subgroups of the plurality of input qudits, wherein a size of each pooling subgroup of the plurality of input qudits is independent of the number of the plurality of input qudits, and input qudits in each pooling subgroup are in proximity to each other, and
      within each pooling subgroup of the plurality of input qudits, performing a pooling layer generalized measurement of a state of a subset of one or more input qudits, and applying at least one quantum channel to at least some of the input qudits in the pooling subgroup on which the pooling layer generalized measurement has not been performed based on an outcome of the pooling layer generalized measurement of the state of the subset of the one or more input qudits in the pooling subgroup;
   repeating said convolving and said pooling at least once to the plurality of input qudits on which a pooling layer generalized measurement has not been performed;
   applying a fully connected quantum channel to a selected subgroup of input qudits on which a pooling layer generalized measurement has not been performed, wherein a size of the selected subgroup is independent of the number of the plurality of input qudits; and
   performing a final generalized measurement of a state of at least some of the input qudits on which a pooling layer generalized measurement has not been performed, wherein an outcome of the final generalized measurement is indicative of the classical or quantum state of the plurality of input qudits.

2. The method of claim 1, wherein one or more of the pooling layer generalized measurements and the final generalized measurement comprises projecting the input qudits into a subspace in a complete set of orthogonal subspaces.

3. The method of claim 2, wherein the outcome of one or more of the pooling layer generalized measurements and the final generalized measurement comprises the subspace in which the input qudits were projected.

4. The method of claim 3, wherein, for the one or more of the pooling layer generalized measurements and the final generalized measurement, each subspace in a corresponding complete set of orthogonal subspaces has dimension equal to one.

5. The method of claim 4, wherein each subspace of dimension equal to one is spanned by a basis state which is a product state of single-qudit states in a computational basis of the input qudits.

6. The method of claim 1, wherein the plurality of input qudits are qubits.

7. The method of claim 1, wherein the quantum channels are unitaries.

8. The method of claim 1, wherein the input qudits in each convolving subgroup are in proximity to each other.

9. The method of claim 8, wherein the at least one convolving layer is translationally invariant.

10. The method of claim 1, wherein the at least one pooling layer is translationally invariant.

11. The method of claim 1, wherein one or more of the quantum channels in the at least one convolving layer, the quantum channels in the at least one pooling layer, the fully connected quantum channel, the pooling layer generalized measurements, and the final generalized measurement is parametrized using at least one variational parameter.

12. The method of claim 11, wherein the at least one variational parameter is optimized to minimize a cost function having a cost value that depends on the at least one variational parameter and on at least one training set.

13. The method of claim 1, wherein each convolving subgroup comprises at most four input qudits, and each pooling subgroup comprises at most four input qudits.

14. The method of claim 1, wherein the plurality of input qudits comprises neutral atoms interacting via Rydberg states.

15. The method of claim 1, further comprising determining, based on the outcome of the final generalized measurement, a phase of matter to which the plurality of input qudits belongs.

16. The method of claim 1, further comprising determining, based on the outcome of the final generalized measurement, a class of classical or quantum states to which the plurality of input qudits belongs.

17. A system comprising:
   an energy source configured to selectively apply quantum channels to qudits;
   a measurement device configured to selectively perform generalized measurements of a state of the qudits; and
   a controller comprising:
      a processor operatively coupled to the energy source and the measurement device, and
      a computer readable storage medium having instructions stored thereon that cause the processor to control the energy source and the measurement device to:
         convolve a plurality of input qudits in a classical or quantum state by applying, with the energy source, at least one convolving layer of quantum channels to convolving subgroups of the plurality of input qudits, wherein a size of each convolving subgroup of the plurality of input qudits is independent of a number of the plurality of input qudits,
         pool the plurality of input qudits by applying at least one pooling layer comprising:
            dividing the plurality of input qudits into pooling subgroups of the plurality of input qudits, wherein a size of each pooling subgroup of the plurality of input qudits is independent of a number of the plurality of input qudits, and the input qudits in each pooling subgroup are in proximity to each other, and within each pooling subgroup of the plurality of input qudits, performing, with the measurement device, a pooling layer generalized measurement of a state of a subset of one or more qudits, and applying, with the energy source, at least one quantum channel to at least some of the qudits in the pooling subgroup on which the pooling layer generalized measurement has not been performed based on an outcome of the pooling layer generalized measurement;

repeat said convolving and said pooling at least once to the plurality of input qudits on which a pooling layer generalized measurement has not been performed, apply, with the energy source, a fully connected quantum channel to a selected subgroup of input qudits on which a pooling layer generalized measurement has not been performed, wherein a size of the selected subgroup is independent of the number of the plurality of input qudits, and perform, with the measurement device, a final generalized measurement of a state of at least some of the qudits on which a pooling layer generalized measurement has not been performed, wherein an outcome of the final generalized measurement is indicative of the classical or quantum state of the plurality of input qudits.

18. The system of claim 17 wherein one or more of the pooling layer generalized measurements and the final generalized measurement comprises projecting input qudits into a subspace in a complete set of orthogonal subspaces.

19. The system of claim 18, wherein the outcome of one or more of the pooling layer generalized measurements and the final generalized measurement comprises the subspace in which the input qudits were projected.

20. The system of claim 19, wherein for the one or more of the pooling layer generalized measurements and the final generalized measurement, each subspace in a corresponding complete set of orthogonal subspaces has dimension equal to one.

21. The system of claim 20, wherein each subspace of dimension equal to one is spanned by a basis state which is a product state of single-qudit states in a computational basis of the input qudits.

22. The system of claim 17 wherein the energy source comprises one or more of at least one laser light source, at least one microwave generator, and at least one magnetic field generator.

23. The system of claim 17 wherein the measurement device comprises one of more of at least one photodetector, at least one microwave resonator, and at least one cavity resonator.

24. The system of claim 17 wherein the plurality of input qudits are qubits.

25. The system of claim 17 wherein the quantum channels in one or more of the quantum channels are unitaries.

26. The system of claim 17 wherein the input qudits in each convolving subgroup are in proximity to each other.

27. The system of claim 26, wherein the at least one convolving layer is translationally invariant.

28. The system of claim 17 wherein the at least one pooling layer is translationally invariant.

29. The system of claim 17 wherein one or more of the quantum channels in the at least one convolving layer, the quantum channels in the at least one pooling layer, the fully connected quantum channel, the pooling layer generalized measurements, and the final generalized measurement is parametrized using at least one variational parameter.

30. The system of claim 29, wherein the at least one variational parameter is optimized to minimize a cost function having a cost value that depends on the at least one variational parameter and on at least one training set.

31. The system of claim 17 wherein each convolving subgroup comprises at most four qudits, and each pooling subgroup comprises at most four input qudits.

32. The system of claim 17 wherein the plurality of input qudits comprises neutral atoms interacting via Rydberg states.

33. The system of claim 17 wherein the instructions further cause the processor to determine, based on the outcome of the final generalized measurement, a phase of matter to which the plurality of input qudits belongs.

34. The system of claim 17 wherein the instructions further cause the processor to determine, based on the outcome of the final generalized measurement, a class of classical or quantum states to which the plurality of input qudits belongs.

* * * * *